United States Patent
Fong et al.

(10) Patent No.: US 11,792,784 B2
(45) Date of Patent: Oct. 17, 2023

(54) TECHNIQUES TO FACILITATE MULTIPLEXING SCI-ONLY GRANT AND DATA-ONLY SPS TRAFFIC ON SIDELINK

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Junyi Li, Fairless Hills, PA (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/394,317

(22) Filed: Aug. 4, 2021

(65) Prior Publication Data

US 2023/0042401 A1 Feb. 9, 2023

(51) Int. Cl.
*H04W 72/1263* (2023.01)
*H04W 72/20* (2023.01)
*H04W 72/52* (2023.01)
*H04W 72/0446* (2023.01)

(52) U.S. Cl.
CPC ... *H04W 72/1263* (2013.01); *H04W 72/0446* (2013.01); *H04W 72/20* (2023.01); *H04W 72/52* (2023.01)

(58) Field of Classification Search
CPC ......... H04W 72/1263; H04W 72/0446; H04W 72/20; H04W 72/52
See application file for complete search history.

(56) References Cited

U.S. PATENT DOCUMENTS

| 2019/0174530 | A1* | 6/2019 | Kim | H04W 72/12 |
| 2021/0136783 | A1* | 5/2021 | Fakoorian | H04W 76/14 |
| 2021/0266992 | A1* | 8/2021 | Kim | H04M 15/49 |
| 2022/0095280 | A1* | 3/2022 | Farag | H04W 72/20 |

OTHER PUBLICATIONS

Huawei R1-1911882: Sidelink physical layer structure for NR V2X Nov. 2019 (Year: 2019).*
Intel R1-1910650: Resource allocation Mode-2 for NR V2X sidelink communication Oct. 2019 (Year: 2019).*

(Continued)

*Primary Examiner* — Rina C Pancholi
(74) *Attorney, Agent, or Firm* — Procopio, Cory, Hargreaves & Savitch LLP/QUALCOMM

(57) ABSTRACT

Apparatus, methods, and computer-readable media for facilitating multiplexing SCI-only grant and data-only SPS traffic on sidelink are disclosed herein. An example method for wireless communication at a first UE includes transmitting a sidelink transmission to a second UE at a first resource, the sidelink transmission including data-only traffic and scheduling information corresponding to future data traffic. The example method also includes transmitting a time offset indicator indicating a starting resource of the future data traffic.

30 Claims, 17 Drawing Sheets

(56) References Cited

OTHER PUBLICATIONS

Huawei, et al., "Sidelink Physical Layer Structure for NR V2X", 3GPP TSG RAN WG1 Meeting #99, R1-1911882, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823064, 35 Pages, Common and Dedicated Resource Pools, p. 4, Paragraph 2.3—p. 5, Figure 2, p. 19.
Intel Corporation: "Remaining Opens of Resource Allocation Mode-2 for NR V2X Design", R1-2000731, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020, 16 Pages, XP051853424, the whole document. unselected.
Intel Corporation: "Resource Allocation Mode-2 for NR V2X Sidelink Communication," 3GPP TSG RAN WG1 Meeting #98bis, R1-1910650, 3rd Generation Partnership Project (3GPP), Mobile Competence Centre, 650, Route Des Lucioles, F-06921 Sophia-Antipolis Cedex, France, vol. RAN WG1 No. Chongqing, China, Oct. 14-20, 2019, Oct. 8, 2019, pp. 1-28, the whole document, pp. 3,7, 17; figure 4, pp. 1-15.
International Search Report and Written Opinion—PCT/US2022/030956—ISA/EPO—dated Aug. 25, 2022.

\* cited by examiner

| 702 ↗ | 704 ↗ |
|---|---|
| Resource Pool Index | # of bits depends on the number of resources pools |
| Time gap | 3 bits |
| HARQ Process Number (HPN) | 4 bits |
| New Data Indicator (NDI) | 1 bit |
| Lowest Sub-channel Index | # of bits depends on the number of sidelink sub-channels |
| TDRA for SCI (e.g., SCI-1) | # of bits depending on number of slot reservations and number of subchannels |
| TDRA for SCI (e.g., SCI-1) | 5 or 9 bits for 2 or 3 reservations |
| PSFCH-to-HARQ feedback | # of bits depends on the on the number of entries in a higher layer |
| PUCCH Resource Indicator (PRI) | 3 bits |
| Configuration index | 0 or 3 bits |
| Sidelink Assignment Index (SAI) | 2 bits |

| | |
|---|---|
| Priority | 3 bits |
| FDRA | bits depending on # of slot reservations and # subchannels |
| TDRA | 5 or 9 bits for 2 or 3 reservations |
| Resource reservation period | bits depending on # allowed periods |
| DM-RS pattern | bits depending on # configured patterns |
| SCI 2 format | 2 bits |
| Beta offset for SCI 2 rate matching | 2 bits |
| DM-RS port | 1 bit indicating one or two data layers |
| MCS | 5 bits |
| Additional MCS table | 0-2 bits |
| PSFCH overhead indicator | 0 or 1 bit |
| Reserved bits | bits up to upper layer |

FIG. 9A

| | |
|---|---|
| HARQ ID | bits depending on # HARQ process |
| NDI | 1 bit |
| RV-ID | 2 bits |
| Source ID | 8 bits |
| Dest. ID | 16 bits |
| HARQ enable/disable | 1 bit |
| SCI 2-A only fields | |
| Cast type (broadcast, groupcast, unicast) | 2 bits |
| CSI request | 1 bit |
| SCI 2-B only fields | |
| Zone ID | 12 bits |
| Communication range | 4 bits |

FIG. 9B

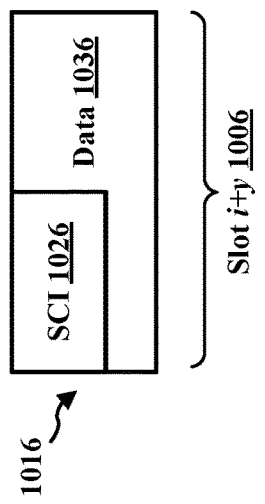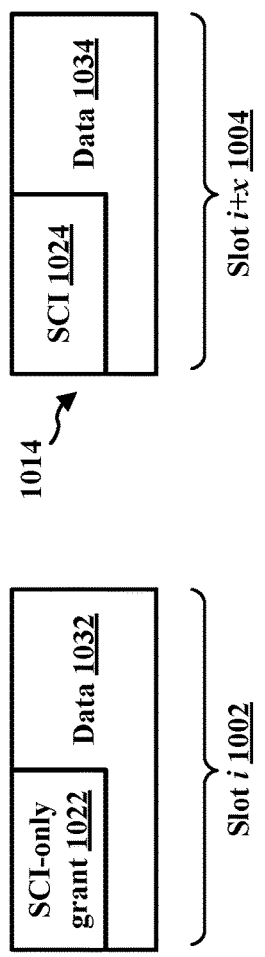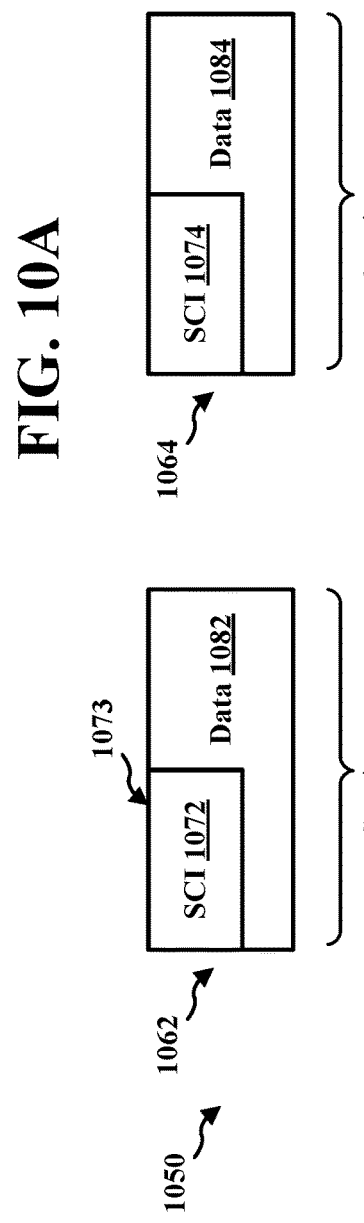
FIG. 10A
FIG. 10B
FIG. 10C

TECHNIQUES TO FACILITATE MULTIPLEXING SCI-ONLY GRANT AND DATA-ONLY SPS TRAFFIC ON SIDELINK

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). An example apparatus may transmit a sidelink transmission to a second UE at a first resource, the sidelink transmission including data-only traffic and scheduling information corresponding to future data traffic. The example apparatus may also transmit a time offset indicator indicating a starting resource of the future data traffic.

In an aspect of the disclosure, a method, a computer-readable medium, and an apparatus are provided for wireless communication at a first UE. An example apparatus may receive a sidelink transmission from a second UE at a first resource, the sidelink transmission including data-only traffic and scheduling information corresponding to future data traffic. The example apparatus may also receive a first indicator indicating a starting resource of the future data traffic. Additionally, the example apparatus may communicate SPS traffic at the starting resource, the future data traffic including the SPS traffic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 illustrates an example downlink control information for allocating sidelink resources, in accordance with various aspects of the present disclosure.

FIG. 9A illustrates an example first stage sidelink control information (SCI), in accordance with various aspects of the present disclosure.

FIG. 9B illustrates an example second stage SCI, in accordance with various aspects of the present disclosure.

FIG. 10A illustrates a sequence of slots, in accordance with various aspects of the present disclosure.

FIG. 10B illustrates another example sequence including slots, in accordance with various aspects of the present disclosure.

FIG. 10C depicts a table that illustrates the reservations signaled by an SCI in a first slot, in accordance with various aspects of the present disclosure.

DETAILED DESCRIPTION

Figure 1:
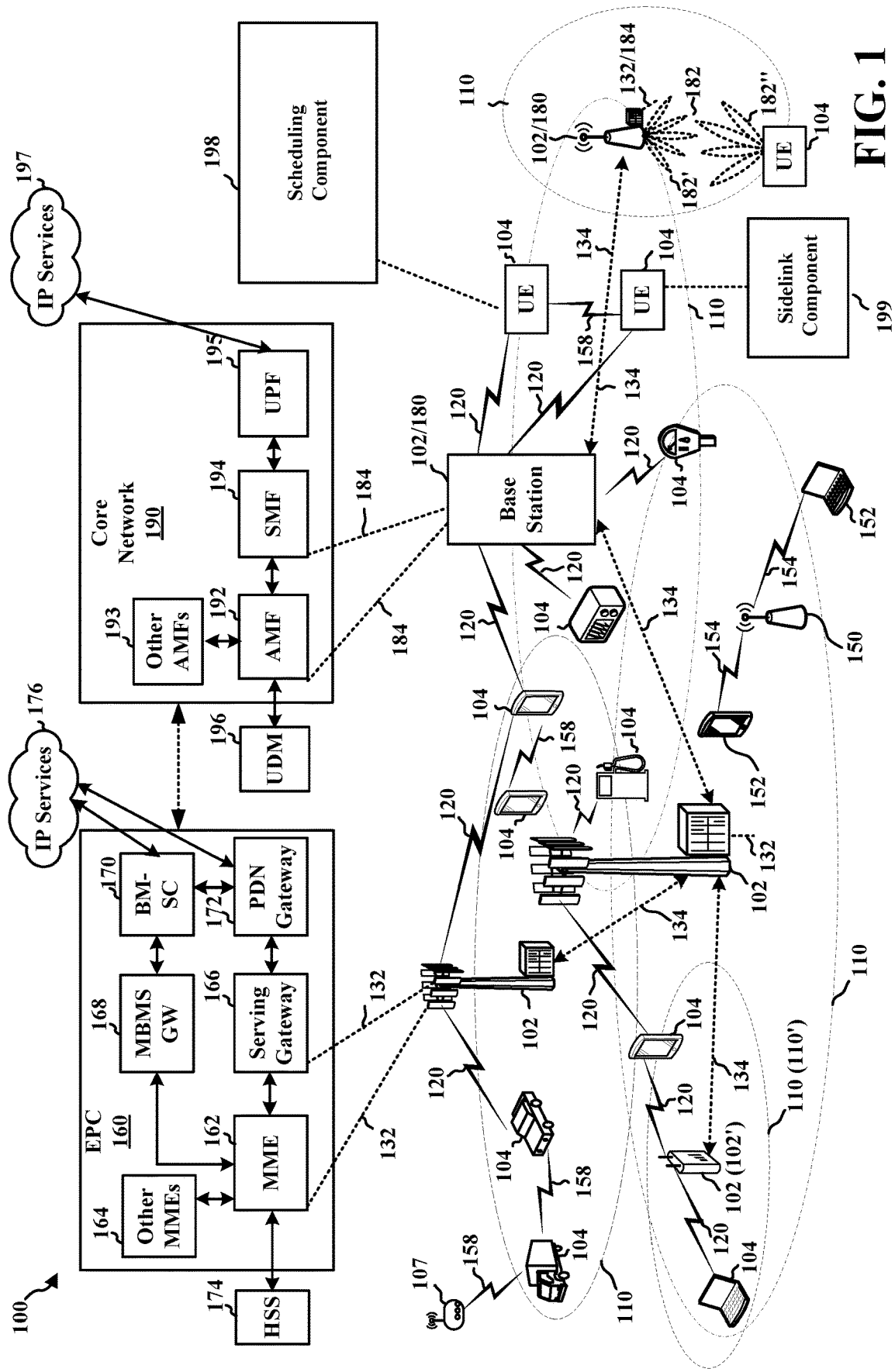
FIG. 1 is a diagram illustrating an example of a wireless communications system and an access network.

Sidelink communication enables a UE to communicate with another UE directly. Sidelink may be beneficial for vehicle-based communications that allows a vehicle UE to communicate directly with another UE or a pedestrian UE. Sidelink may also be beneficial in an industrial IoT (IIoT) environment in which sidelink can enable direct communication between a programmable logical controller (PLC) and one or more sensors/actuators (SAs) located within the IIoT environment. In such an environment, it may be beneficial for the PLC to be a wireless PLC to provide a flexible and simple deployment. In some such deployments, a PLC may control any suitable quantity of SAs. For example, a PLC may control 20 to 50 SAs. Communication within an IIoT deployment may be configured with requirements to provide for acceptable communication. For example, IIoT traffic may have low latency requirements (e.g., 1-2 milliseconds (ms)) and an ultra-reliability requirement (e.g., $10^{\wedge}-6$) error rate. If the SAs of the IIoT deployment were configured to communicate through a base station, it may be appreciated that such a deployment would use significant over the air (OTA) resources, which would negatively affect latency and reliability.

For example, IIoT traffic may be deterministic and with a relatively small packet size (e.g., 32 to 256 Bytes). For example, an SA may be configured to transmit an alarm event, which may use limited bandwidth resources. Thus, the bandwidth for IIoT traffic may be low. For example, two RBs may be sufficient for some use cases. SAs may have constraints on UE capability in terms of bandwidth and/or processing power. However, the overall bandwidth within the IIoT deployment may be large and include dedicated frequency bands and/or unlicensed bands. Additionally, an IIoT deployment may provide a challenging RF environment including blockage and interference.

In some examples, a UE may reserve resources for future transmissions. For example, a first reservation for a first resource (e.g., at slot i) may start in the same slot as the resource reservation. That is, the SCI in the first slot i and the corresponding data (e.g., PSSCH) may be coupled. Moreover, the SCI in each slot is coupled with the PSSCH.

However, it may be appreciated that such a scheme includes processing overhead of SCI. That is, the SCI of each sidelink transmission is processed. However, the sidelink transmission may include a retransmission and, thus, the processing of SCI of the sidelink transmission may be repetitive. In some examples, to reduce processing overhead of the SCI of each sidelink transmission, SCI-based semi-persistent scheduling (SPS) transmissions on sidelink with data alone may be used for forward-link grants (e.g., the PLC schedules traffic from the PLC to an SA) and for reverse link grants (e.g., the PLC schedules traffic from an SA to the PLC). SCI-based SPS transmissions enable the sidelink devices to skip transmitting repetitive SCIs for SPS transmissions and, thus, reduce the processing overhead associated with the SCI of the transmissions. However, it may be appreciated that by skipping the SCI, there may be unused SCI resources that are wasted in SPS transmissions.

In some examples, to reduce SA scheduling overhead, the PLC may transmit an SCI-only grant. The SCI-only grant may enable the PLC to schedule traffic from an SA to itself (e.g., a reverse-link grant). By scheduling the traffic to itself, the PLC may reduce overhead due to SA scheduling. However, the PSSCH resources may be unused resources that are wasted resources in the SCI-only grant transmission.

Transmitting an SCI-only grant or transmitting data-only traffic may result in resources that are unused and wasted. Data-only traffic may refer to a data transmission, e.g., PSSCH that is transmitted separately from SCI. SCI-only traffic may refer to SCI that is transmitted separately from PSSCH. Thus, it may be appreciated that multiplexing SCI-only grants and data-only traffic may reduce unused resources. To facilitate such multiplexing, aspects disclosed herein facilitate decoupling the SCI and the corresponding PSSCH in the same slot. For example, the transmitting sidelink UE (e.g., the PLC) may transmit SCI in a first slot and indicate that the corresponding PSSCH is being transmitted in a second slot different than the first slot.

To indicate the starting time of the grant, disclosed techniques provide a time indicator to facilitate decoupling the SCI and the corresponding PSSCH (e.g., the SPS traffic) in the same slot so that the PSSCH corresponding to the SCI does not necessarily start right away (e.g., in the same slot). For example, the SCI-only grant may include the time indicator to indicate to the receiving sidelink UE that the SCI of the current slot is disassociated with the included data. That is, the time indicator may indicate that while the slot may include SCI and PSSCH, the SPS traffic corresponding to the SCI is located in another slot. Thus, aspects disclosed herein facilitate multiplexing SCI-only traffic with data-only traffic in a slot. In some examples, the time indicator may be included with the SCI (e.g., in a first stage SCI).

In some examples, the transmitting sidelink UE (e.g., the PLC) may include a traffic direction indicator to facilitate scheduling sidelink transmissions for both outbound traffic and inbound traffic. For example, the SCI-only grant may include the traffic direction indicator set to a first value (e.g., a "0") to indicate that the SCI-only grant is a forward-link grant, and set to a second value (e.g., a "1") to indicate that the SCI-only grant is a reverse-link grant. The traffic direction indicator may be included in the SCI (e.g., SCI-1 and/or SCI-2).

Multiplexing SCI-only grants and SPS traffic, for example, from a PLC to an SA, may facilitate reducing unused resources. For example, with respect to traffic from SAs to a PLC, event when the traffic is SPS-configured, SCI-only grants may useful for the PLC to schedule the retransmissions from the SA to the PLC. For example, the SA may be limited computing power or may be out of Uu coverage and unable to obtain a grant.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a device configured to communicate using sidelink, such as a UE 104, may be configured to manage one or more aspects of wireless communication by facilitating multiplexing of SCI-only grants and data-only SPS traffic on sidelink. For example, the UE 104 may include a scheduling component 198 configured to transmit a sidelink transmission to a second UE at a first resource, the sidelink transmission including data-only traffic and scheduling information corresponding to future data traffic. The example scheduling component 198 may also be configured to transmit a time offset indicator indicating a starting resource of the future data traffic.

In another configuration, a device configured to communicate using sidelink, such as a UE 104, may be configured to manage one or more aspects of wireless communication by facilitating multiplexing of SCI-only grants and data-only SPS traffic on sidelink. For example, the UE 104 may include a sidelink component 199 configured to receive a sidelink transmission from a second UE at a first resource, the sidelink transmission including data-only traffic and scheduling information corresponding to future data traffic. The example sidelink component 199 may also be configured to receive a first indicator indicating a starting resource of the future data traffic. Additionally, the example sidelink component 199 may be configured to communicate SPS traffic at the starting resource, the future data traffic including the SPS traffic.

The aspects presented herein may enable a UE to multiplex SCI-only grants and data-only traffic in a slot, which may facilitate improving communication performance, for example, by reducing wasted SCI resources and/or data resources in the slot.

Although the following description provides examples directed to 5G NR (and, in particular, to sidelink communication), the concepts described herein may be applicable to other similar areas, such as LTE, LTE-A, CDMA, GSM, and/or other wireless technologies, in which a UE may communicate directly with another UE (e.g., without communicating through a base station).

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
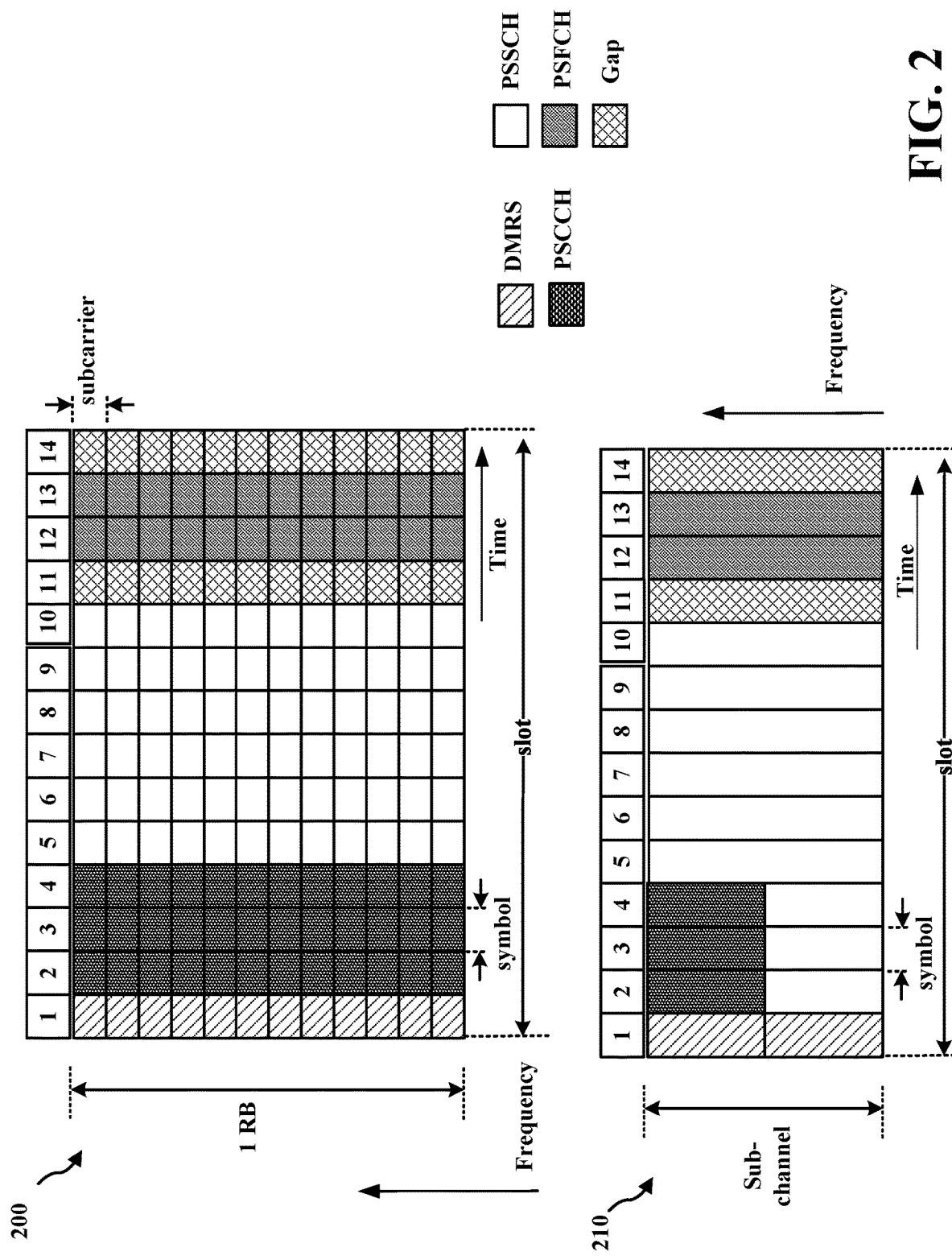
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
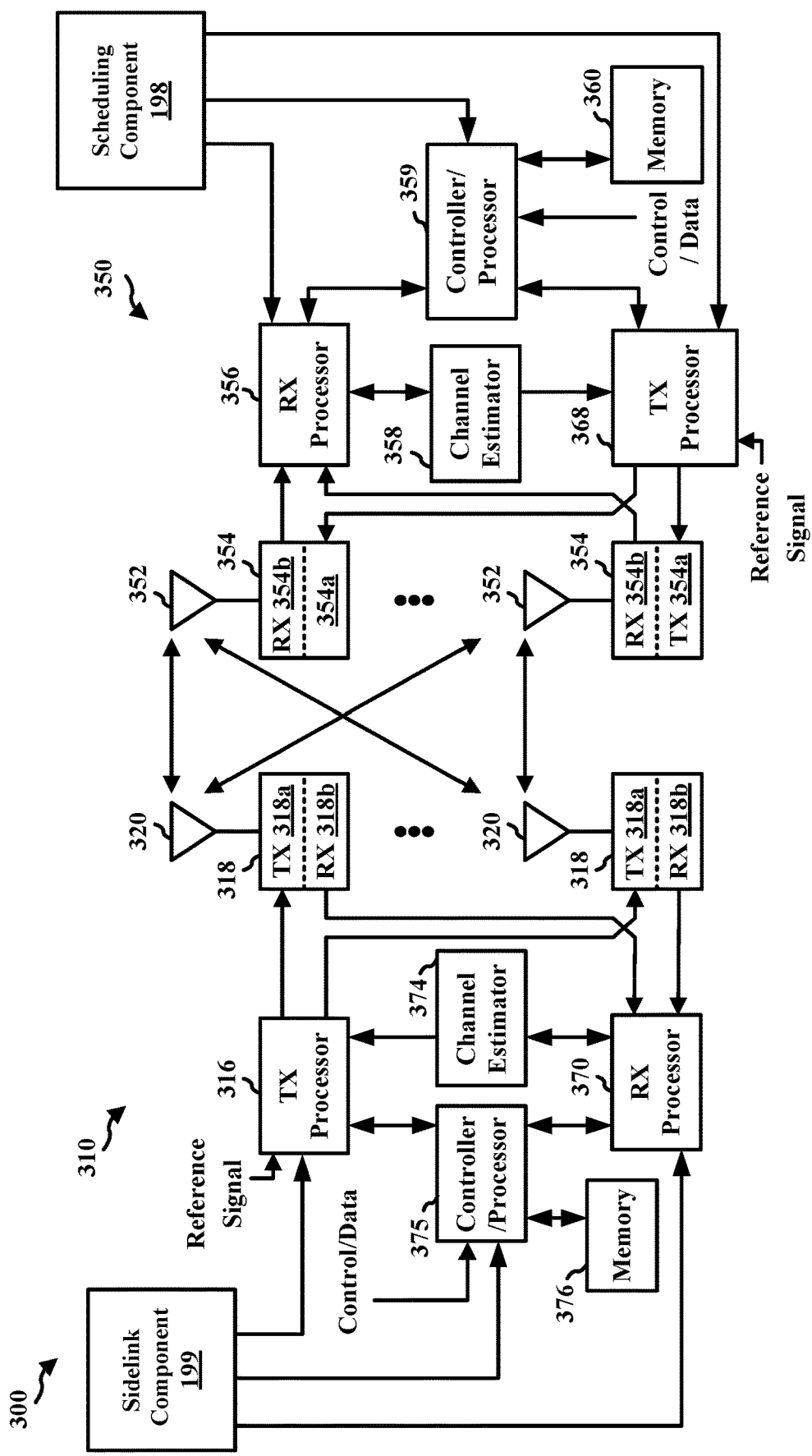
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 359 that stores program codes and data. The memory 359 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the scheduling component 198 of FIG. 1.

At least one of the TX processor 316, the RX processor 370, and the controller/processor 375 may be configured to perform aspects in connection with the sidelink component 199 of FIG. 1.

Figure 4:
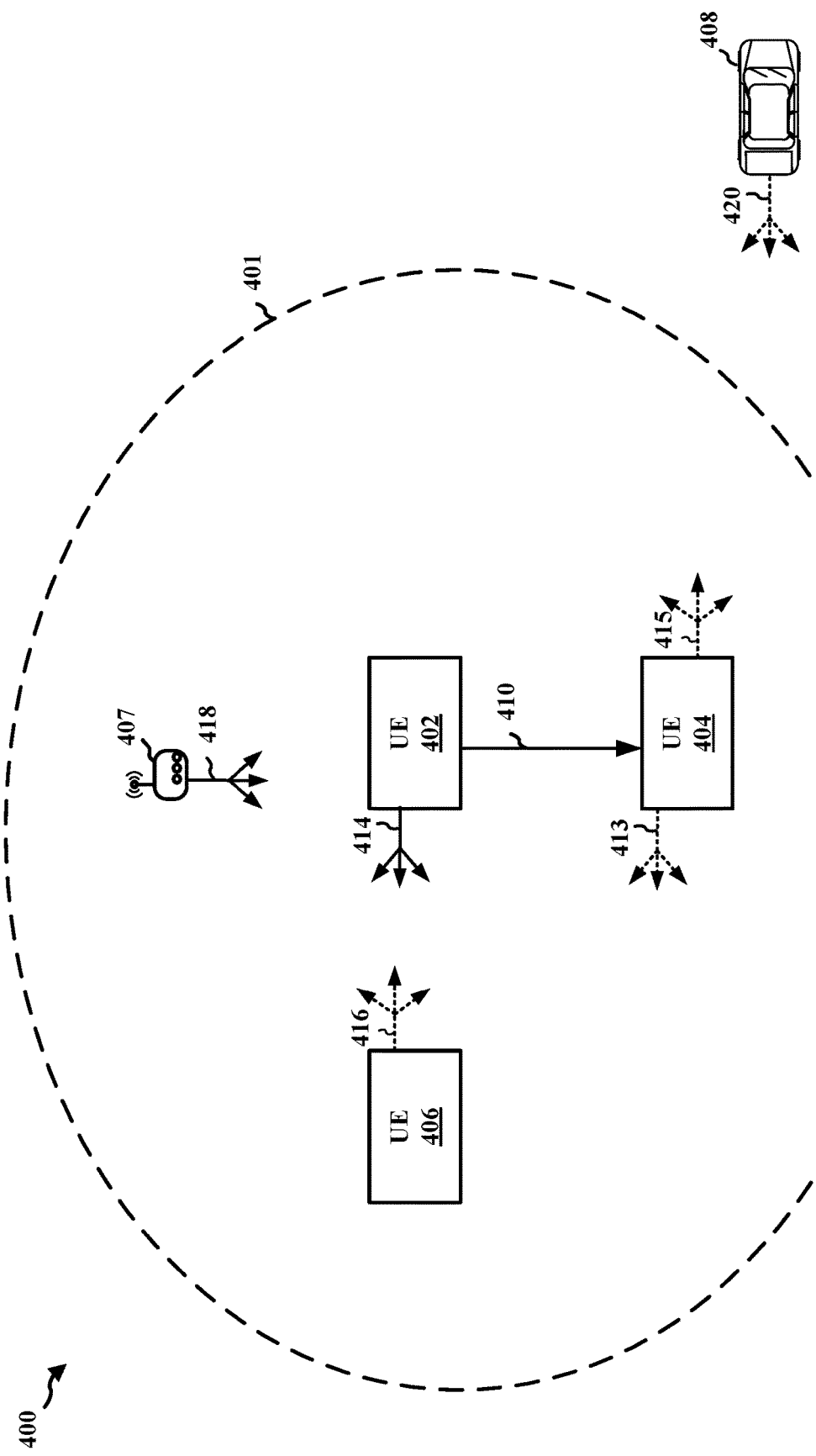
FIG. 4 illustrates an example of sidelink communication between devices, in accordance with aspects presented herein.

FIG. 4 illustrates an example 400 of sidelink communication between devices, as presented herein. The communication may be based on a slot structure comprising aspects described in connection with FIG. 2 or another sidelink structure. For example, a first UE 402 may transmit a sidelink transmission 414, e.g., comprising a control channel (e.g., PSCCH) and/or a corresponding data channel (e.g., PSSCH), that may be received by a second UE 404, a third UE 406, and/or a fourth UE 408. The sidelink transmission 414 may be received directly from the first UE 402, e.g., without being transmitting through a base station. Additionally, or alternatively, an RSU 407 may receive communication from and/or transmit communication to the UEs 402, 404, 406, 408. As shown in FIG. 4, the RSU 407 may transmit a sidelink transmission 418 that is received directly from the RSU 407.

The UEs 402, 404, 406, 408 and/or the RSU 407 may each be capable of operating as a transmitting device in addition to operating as a receiving device. Thus, the second UE 404 is illustrated as transmitting sidelink transmissions 413, 415, the third UE 406 is illustrated as transmitting a sidelink transmission 416, and the fourth UE 408 is illustrated as transmitting a sidelink transmission 420. One or more of the transmissions 413, 414, 415, 416, 418 may be broadcast or multicast to nearby devices. For example, the first UE 402 may transmit communication intended for receipt by other UEs within a range 401 of the first UE 402. In other examples, one or more of the transmissions 413, 414, 415, 416, 418 may be groupcast to nearby devices that are a member of a group. In other examples, one or more of the transmissions 413, 414, 415, 416, 418 may be unicast from one UE to another UE.

A sidelink transmission may provide sidelink control information (SCI) including information to facilitate decoding the corresponding data channel. The SCI may also include information that a receiving device may use to avoid interference. For example, the SCI may indicate reserved time resources and/or reserved frequency resources that will be occupied by the data transmission, and may be indicated in a control message from the transmitting device.

One or more of the UEs 402, 404, 406, 408 and/or the RSU 407 may include a scheduling component, similar to the scheduling component 198 described in connection with FIG. 1. One or more of the UEs 402, 404, 406, 408 and/or the RSU 407 may additionally or alternatively include a sidelink component, similar to the sidelink component 199 described in connection with FIG. 1.

In examples disclosed herein, when a UE transmits a transmission for sidelink communication, the transmitting UE may be referred to as a "sidelink transmitting UE" or a "sidelink transmitting device." When a UE receives a transmission via sidelink, the receiving UE may be referred to as a "sidelink receiving UE" or a "sidelink receiving device." For example, in the example of FIG. 4, the first UE 402 (e.g., a sidelink transmitting UE) may transmit a sidelink transmission 410 via sidelink. The second UE 404 (e.g., a sidelink receiving UE) may receive, via sidelink, the sidelink transmission 410.

Sidelink communication may be based on different types or modes of resource allocation mechanisms. In a first resource allocation mode (which may be referred to herein as "Mode 1"), centralized resource allocation may be provided by a network entity. For example, and referring to the example of FIG. 1, a base station 102/180 may determine resources for sidelink communication and may allocate resources to different UEs 104 to use for sidelink transmissions. In this first mode, a UE receives the allocation of sidelink resources from the base station 102/180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether a selected sidelink resource has been reserved by other UE(s) before selecting the sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
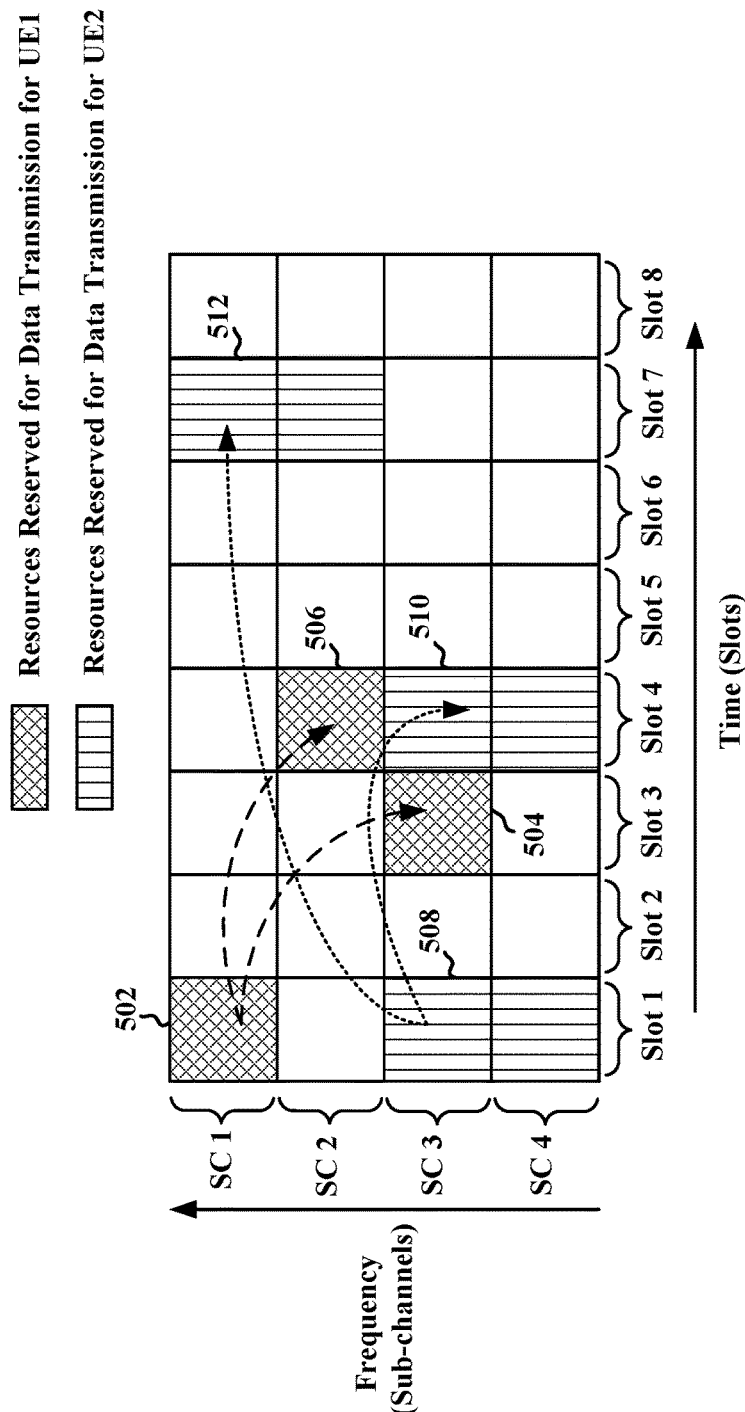
FIG. 5 illustrates an example of time and frequency resources for resource reservation for sidelink communication.

FIG. 5 is an example 500 of time and frequency resources showing reservations for sidelink transmissions, as presented herein. The resources may be comprised in a sidelink resource pool, for example. The resource allocation for each UE may be in units of one or more sub-channels in the frequency domain (e.g., sub-channels SC1 to SC 4), and may be based on one slot in the time domain (e.g., slots 1 to 8). The UE may also use resources in the current slot to perform an initial transmission, and may reserve resources in future slots for retransmissions. In the illustrated example of FIG. 5, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., a first data retransmission 504 and a second data retransmission 506). For example, the first UE may reserve sub-channels SC 3 at slot 3 and SC 2 at slot 4 for future retransmissions as shown by FIG. 5. The first UE then transmits information regarding which resources are being used and/or reserved by it to other UE(s). The first UE may do so by including the reservation information in a reservation resource field of the SCI, e.g., a first stage SCI.

FIG. 5 illustrates that a second UE ("UE2") reserves resources in sub-channels SC 3 and SC 4 at slot 1 for its current data transmission 508, reserves a first data retransmission 510 at slot 4 using sub-channels SC 3 and SC 4, and reserves a second data retransmission 512 at slot 7 using sub-channels SC 1 and SC 2, as shown by FIG. 5. Similarly, the second UE may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the second UE may transmit SCI reserving resources for data transmissions 508, 510, and 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

Sidelink communication enables a UE to communicate with another UE directly. For example, and with respect to the example of FIG. 4, the first UE 402 and the second UE 404 may communicate without routing the communication through a base station. Sidelink may be beneficial for vehicle-based communications (e.g., V2V, V2I, V2N, V2P, C-V2X, etc.) that allows a vehicle UE to communicate directly with another UE or a pedestrian UE.

Sidelink may also be beneficial in an industrial IoT (IIoT) environment in which sidelink can enable direct communication between a programmable logical controller (PLC) and one or more sensors/actuators (SAs) located within the IIoT environment. In such an environment, it may be beneficial for the PLC to be a wireless PLC to provide a flexible and simple deployment. In some such deployments, a PLC may control any suitable quantity of SAs. For example, a PLC may control 20 to 50 SAs. Communication within an IIoT deployment may be configured with requirements to provide for acceptable communication. For example, IIoT traffic may have low latency requirements (e.g., 1-2 milliseconds (ms)) and an ultra-reliability requirement (e.g., $10^{-6}$) error rate. If the SAs of the IIoT deployment were configured to communicate through a base station, it may be appreciated that such a deployment would use significant over the air (OTA) resources, which would negatively affect latency and reliability.

For example, IIoT traffic may be deterministic and with a relatively small packet size (e.g., 32 to 256 Bytes). For example, an SA may be configured to transmit an alarm event, which may use limited bandwidth resources. Thus, the bandwidth for IIoT traffic may be low. For example, two RBs may be sufficient for some use cases. SAs may have constraints on UE capability in terms of bandwidth and/or processing power. However, the overall bandwidth within the IIoT deployment may be large and include dedicated frequency bands and/or unlicensed bands. Additionally, an IIoT deployment may provide a challenging RF environment including blockage and interference.

Figure 6:
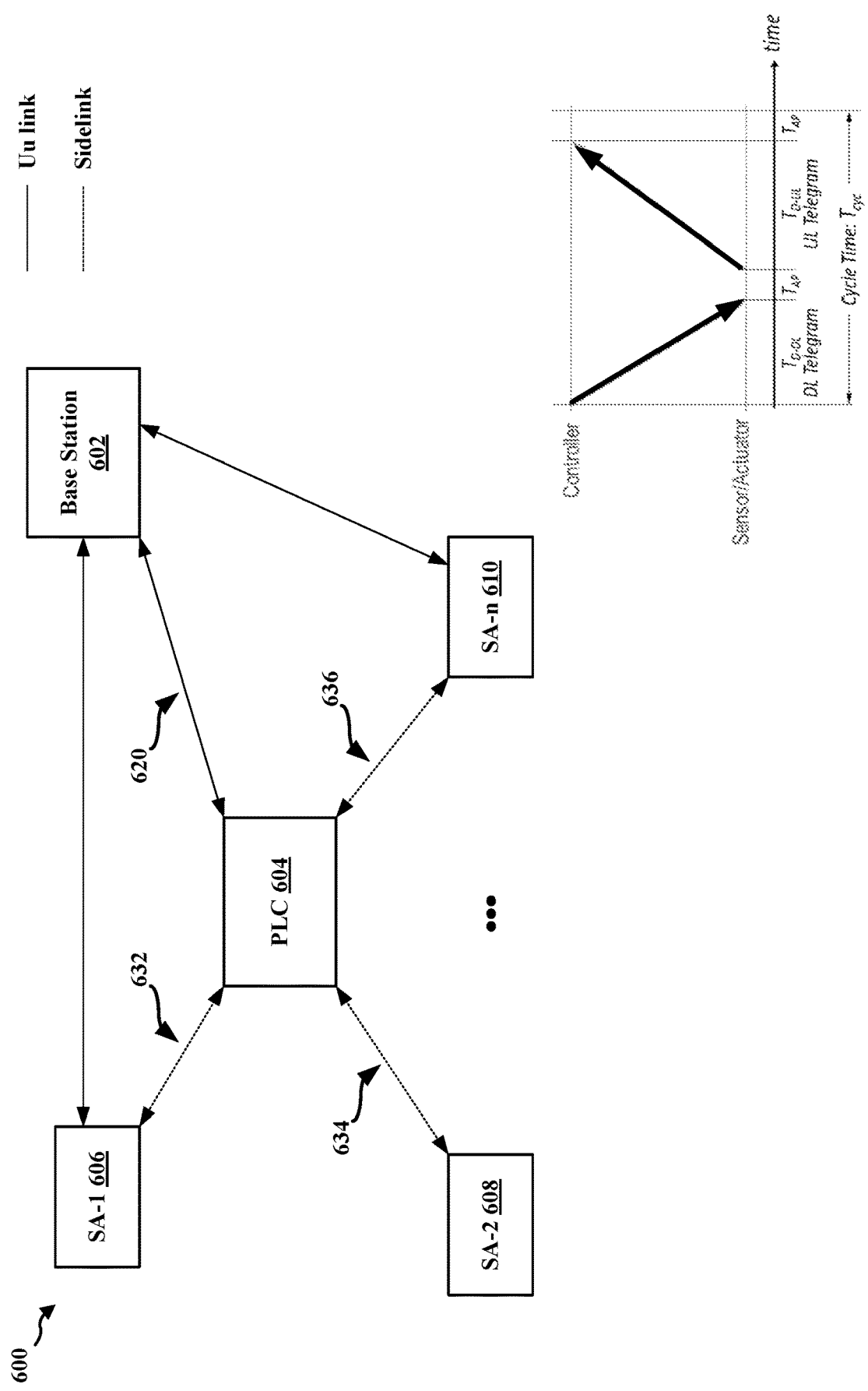
FIG. 6 illustrates an example communications environment of wireless communication between devices in an IIoT deployment, in accordance with various aspects of the present disclosure.

FIG. 6 illustrates an example communications environment 600 of wireless communication between devices in an IIoT deployment, as presented herein. The communication may be based on Uu link (e.g., cellular access) and sidelink. For example, a base station 602 may establish a Uu link connection 620 with a PLC 604. The PLC 604 may control a suitable quantity of SAs within the IIoT deployment, such as 20 to 50 SAs. In the illustrated example, the PLC 604 communicates with n SAs based on sidelink. For example, the PLC 604 may communicate with a first SA 606 ("SA-1") using a first sidelink connection 632, may communicate with a second SA 608 ("SA-2") using a second sidelink connection 634, . . . , and may communicate with an nth SA 610 ("SA-n") using a third sidelink connection 636.

Although the above example of FIG. 6 refers to a PLC and SAs, it may be appreciated that aspects of the PLC 604 may be implemented by a UE and aspects of the SAs 606, 608, 610 may also be implemented by a UE.

As described above, in some examples, the resources for sidelink communication may be allocated by a base station. For example, the base station 602 may transmit downlink control information (e.g., DCI format 3_0) that is received by the PLC 604 via the connection 620. The DCI may schedule PSCCH and PSSCH in a cell supported by the base station 602. The cyclic redundancy check (CRC) of the DCI may be scrambled via a radio network temporary identifier (RNTI), such as a sidelink RNTI (SL-RNTI) or a sidelink configured scheduling RNTI (SL-CS-RNTI).

The PLC 604 may then provide a grant for a sidelink transmission based on the DCI. For example, the PLC 604 may transmit a forward-link grant scheduling a sidelink transmission from the PLC 604 to an SA. Additionally, or alternatively, the PLC 604 may transmit a reverse-link grant scheduling a sidelink transmission from an SA to the PLC.

FIG. 7 illustrates an example DCI 700 for allocating sidelink resources, as presented herein. In the illustrated example, the DCI 700 is a DCI format 3_0. However, other examples may use additional or alternative formats. The example of FIG. 7 includes a first column 702 indicating information that may be included in the DCI 700 and a second column 704 indicating a quantity of bits that may be associated with the respective information.

Resources may be allocated via dynamic grants and configured grants. With respect to dynamic grants, the transmitting UE requests the base station to schedule resources for a sidelink transmission. For example, and referring again to the example of FIG. 6, after determining a transport block (TB) for sidelink transmission, the PLC 604 (e.g., a transmitting UE) may transmit a scheduling request to the base station 602, may receive, from the base station 602, DCI (e.g., the DCI 700 of FIG. 7) allocating sidelink resources for the sidelink transmission, and then use the allocated resources for transmitting the TB to one or more of the SAs 606, 608, 610.

In contrast, configured grants allow the transmitting UE to reduce the delay associated with transmitting the scheduling request and waiting for the DCI by pre-allocating sidelink resources. For example, with configured grants, the base station can allocate a set of sidelink resources to the transmitting UE for transmitting several TBs. The configured grant is configured using a set of parameters including a configured grant index, a time-frequency allocation, and periodicity of the allocated sidelink resources. The transmitting UE can then inform the other UEs of the resources allocated by the base station for a configured grant period using the first stage SCI. The UE can then decide how to use the sidelink resources of an assigned configured grant.

In the second resource allocation mode ("Mode 2"), the UE determines (e.g., without base station scheduling) the sidelink transmission resource(s) within a sidelink resource pool configured by the network (e.g., a base station) or determines the sidelink transmission resource(s) within a preconfigured sidelink resource pool. The transmitting UE may perform channel sensing by blindly decoding all PSCCH channels and finds which resources are reserved for other sidelink transmissions. The transmitting UE may report the available resources to an upper layer and the upper layer may decide the resource usage.

When a UE employs the second resource allocation mode ("Mode 2"), the UE may select the sidelink transmission resource(s) using sensing and resource reservation. Resource reservation may be carried in sidelink control information (SCI) (e.g., the first stage SCI). A sidelink transmission may reserve resources in a current slot and future slots.

Figure 8:
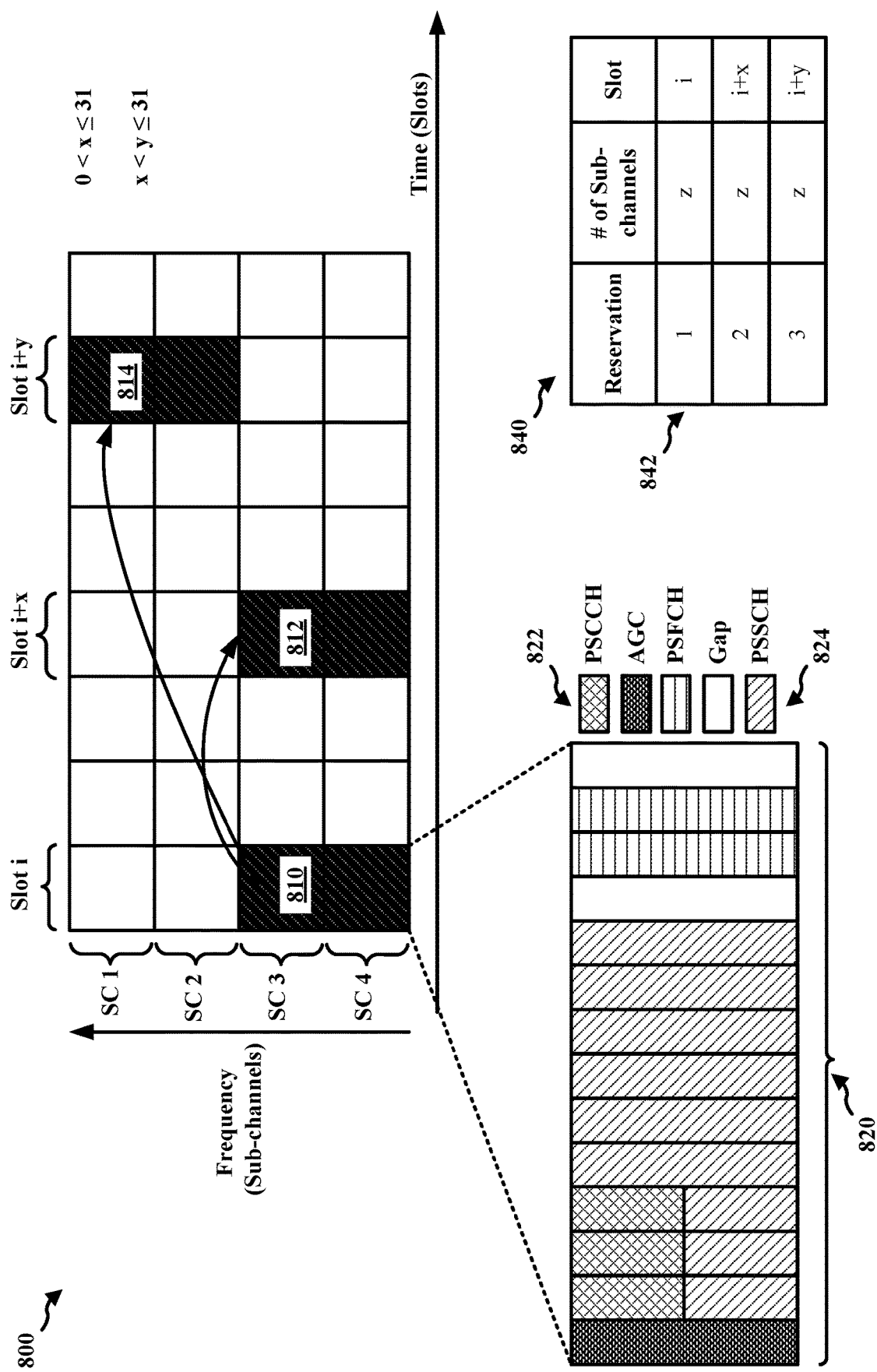
FIG. 8 illustrates a reservation window comprising slots, in accordance with various aspects of the present disclosure.

Resource allocation may be in units of sub-channels in the frequency domain and may be limited to one slot in the time domain. Reservation information may be carried in the SCI (e.g., the first stage SCI). Additionally, reservations may be reserved within a window of 32 slots. FIG. 8 illustrates a reservation window 800 comprising 32 slots, as presented herein. Aspects of the reservation window 800 may be similar to the example of FIG. 5 illustrating time and frequency resources showing reservations for sidelink transmissions with respect to the second UE ("UE2").

In the illustrated example of FIG. 8, the reservation window 800 comprises frequency domain resources along the vertical axis and time domain resources along the horizontal axis. However, other examples may employ additional or alternative techniques for implementing the reservation window.

In the illustrated example of FIG. 8, a UE may transmit a first transmission using a first resource 810 at a first slot i. The UE may also transmit SCI (e.g., via the first transmission) reserving future resources, for example, to transmit a retransmission of the first transmission. For example, the SCI may include frequency domain resource allocations (FDRA) that point to frequency domain resources (e.g., sub-channels) corresponding to one or more future resources. The SCI may also include time domain resource allocations (TDRA) that point to time resources (e.g., slots) corresponding to the one or more future resources.

As shown in FIG. 8, the UE reserves a first future resource 812 (e.g., at slot i+x) and reserves a second future resource 814 (e.g., at slot i+y). In the illustrated example, the resources 812, 814 are associated with future resources, and the values of x and y are greater than 0. Additionally, since the reservation window 800 includes 32 slots, the values of x and y are also less than or equal to 31 (e.g., assuming that the first slot is slot 0). In the illustrated example, the value of x may be greater than 0 and less than or equal to 31. The value of y may be greater than x and less than or equal to 31 since the second future resource 814 occurs after the first future resource 812 in the time domain.

FIG. 8 also includes an example sidelink slot structure 820 of the first resource 810. The example sidelink slot structure 820 in FIG. 8 is merely one example, and other sidelink communication may have a different frame structure and/or different channels for sidelink communication. The example sidelink slot structure 820 may represent a sidelink transmission in the first slot i. For example, data may be organized into transport blocks (TBs) and each TB may be associated with an SCI. A TB may be carried in a PSSCH. The SCI indicates the resources used by the PSSCH that carries the associated TB, as well as further information to facilitate decoding the TB. A PSCCH is sent with the PSSCH.

As shown in FIG. 8, the SCI and the sidelink data (e.g., PSSCH 824) may be transmitted within a same slot. The sidelink control information (e.g., PSCCH 822) may occupy up to one sub-channel with the lowest sub-channel index available. In some examples, the SCI may be transmitted in two stages. The first stage SCI ("SCI-1") may be transmitted in the PSCCH 822 and contain information about the sidelink data and/or resource reservations in future slots. The second stage SCI may be transmitted in the PSSCH 824. A sidelink receiving device may decode the second stage SCI after decoding the PSCCH. A source identifier (ID) may indicate which UE transmitted the sidelink transmission and a destination ID may be used to distinguish whether the sidelink transmission is intended for the sidelink receiving device.

In some examples, the resource may include feedback with respect to a previous transmission. For example, the sidelink slot structure 820 includes a sidelink feedback channel (PSFCH) that may carry an acknowledgement (ACK) or a negative ACK (NACK) upon processing a transmission. In some examples, the responding sidelink UE may be configured to include the ACK or NACK for each transmission, such as for unicast or groupcast transmissions. In some examples, the responding sidelink UE may be configured to provide implicit feedback. For example, the responding sidelink UE may transmit a NACK when a transmission is unsuccessfully processed and may forego transmitting an ACK when the transmission is successfully processed.

In sidelink, each device that receives a sidelink transmission may be capable of decoding the first stage SCI. The first stage SCI may contain information about the sidelink data and/or resource reservations in future slots. For example, FIG. 9A illustrates an example first stage SCI 900. The example of FIG. 9A includes a first column 902 indicating information that may be included in the first stage SCI 900 and a second column 904 indicating a quantity of bits that may be associated with the respective information.

FIG. 9B illustrates an example second stage SCI 950. The example of FIG. 9B includes a first column 952 indicating information that may be included in the second stage SCI 950 and a second column 954 indicating a quantity of bits that may be associated with the respective information. The second stage SCI 950 may be decoded by the target UE and any other UEs within a range of the transmitting UE. For example, and with respect to FIG. 4, the second UE 404 may be the target UE of the sidelink transmission 410, but the third UE 406 may also receive the sidelink transmission 410.

The first stage SCI 900 may be decoded by the target UE and any other UEs within a range of the transmitting UE. For example, and with respect to FIG. 4, the second UE 404 may be the target UE of the sidelink transmission 410, but the third UE 406 may also receive the sidelink transmission 410. The third UE 406 may use information from the first stage SCI 900 of the sidelink transmission 410 for channel sensing and to avoid resource collision. The second stage SCI 950 of the sidelink transmission 410 may be used by the target UE (e.g., the second UE 404) to help decode the sidelink data.

Referring again to the example of FIG. 8, a table 840 illustrates the reservations signaled by an SCI in a first slot i. In the illustrated example, the SCI reserves three resources (e.g., the first resource 810, the first future resource 812, and the second future resource 814). It may be appreciated that the reservations facilitate semi-persistent scheduling (SPS). Each of the reservations are for a same quantity of sub-channels (e.g., z sub-channels). However, the starting sub-channel may be different for any of the reservations. For example, while the first resource 810 and the first future resource 812 start at the same sub-channel in the example reservation window 800, the second future resource 814 starts at a different sub-channel.

As shown in FIG. 8, a first reservation 842 for the first resource 810 (e.g., at slot i) starts in the same slot. That is, the SCI in the first slot i and the corresponding PSSCH are coupled. Moreover, the SCI in each slot is coupled with the PSSCH.

However, it may be appreciated that such a scheme includes processing overhead of SCI. That is, the SCI of each sidelink transmission is processed. However, the sidelink transmission may include a retransmission and, thus, the SCI of the sidelink transmission may be repetitive. In some examples, to reduce processing overhead of the SCI of each sidelink transmission, SCI-based SPS transmissions on sidelink with data alone may be used for forward-link grants (e.g., the PLC schedules traffic from the PLC to an SA) and for reverse link grants (e.g., the PLC schedules traffic from an SA to the PLC). SCI-based SPS transmissions enable the sidelink devices to skip transmitting repetitive SCIs for SPS transmissions and, thus, reduce the processing overhead associated with the SCI of the transmissions. However, it may be appreciated that by skipping the SCI, there may be unused SCI resources that are wasted in SPS transmissions.

In some examples, to reduce SA scheduling overhead, the PLC may transmit an SCI-only grant. The SCI-only grant may enable the PLC to schedule traffic from an SA to itself (e.g., a reverse-link grant). By scheduling the traffic to itself, the PLC may reduce overhead due to SA scheduling. However, the PSSCH resources may be unused resources that are wasted resources in the SCI-only grant transmission.

FIG. 10A illustrates a sequence 1000 of slots, as presented herein. In the example of FIG. 10A, the sequence 1000 includes a first slot 1002 ("slot i") that carries a first resource 1012. The first resource 1012 includes an SCI-only grant 1022. The SCI-only grant 1022 facilitates reducing scheduling overhead, for example, at SAs in an IIoT deployment. For example, the SCI-only grant 1022 may enable the PLC 604 of FIG. 6 to schedule traffic from the first SA 606 to the PLC 604 and, thus, remove the scheduling processing from the first SA 606. The first resource 1012 also includes a data portion 1032. However, the data portion 1032 may include unused resources.

The example sequence 1000 also includes a second slot 1004 ("slot i+x") that carries a second resource 1014. The second resource 1014 includes an SCI portion 1024 and a data portion 1034. The SCI portion 1024 may include first stage SCI related to the data portion 1034. That is, the SCI portion 1024 and the data portion 1034 may be coupled.

The example sequence 1000 also includes a third slot 1006 ("slot i+y") that carries a third resource 1016 including an SCI portion 1026 and a data portion 1036. The third resource 1016 may include data-only traffic. The data-only traffic of the third resource 1016 may facilitate reducing SCI processing overhead. For example, a data portion 1036 of the third resource 1016 may be a retransmission of the data portion 1034 of the second resource 1014. In such examples, the PLC 604 may forego including SCI in the SCI portion 1026 of the third resource 1016 and, thus facilitate reducing SCI processing overhead at the first SA 606 with respect the third resource 1016.

As shown in the example of FIG. 10A, transmitting an SCI-only grant (e.g., at the first slot 1002) or transmitting data-only traffic (e.g., at the third slot 1006) may result in resources that are unused and wasted. Thus, it may be appreciated that multiplexing SCI-only grants and data-only traffic may reduce unused resources. To facilitate such multiplexing, aspects disclosed herein facilitate decoupling the SCI and the corresponding PSSCH in the same slot. For example, the transmitting sidelink UE (e.g., the PLC) may transmit SCI in a first slot and indicate that the corresponding PSSCH is being transmitted in a second slot different than the first slot.

FIG. 10B illustrates another example sequence 1050 including slots, as presented herein. In the illustrated example, the sequence 1050 includes a first slot 1052 ("slot i") that carries a first resource 1062 including an SCI portion 1072 and a data portion 1082. The data portion 1082 of the first resource 1062 may include data-only traffic. To reduce unused resources that may be associated with the first resource 1062, the SCI portion 1072 may include an SCI-only grant that is decoupled from the data portion 1082. That is, the SCI portion 1072 may include an SCI-only grant 1073 that schedules traffic for a future slot and not the current slot.

For example, the SCI-only grant 1073 may schedule traffic for a second slot 1054 ("slot i+m") that carries a second resource 1064 including an SCI portion 1074 and a data portion 1084. In the example of FIG. 10B, the data portion 1084 may include data that corresponds to the SCI-only grant 1073 of the first resource 1062. For example, the data portion 1084 may be decoded based on information included in the SCI-only grant 1073 of the first resource 1062.

Thus, the unused resources associated with an SCI-only grant (e.g., the data portion 1032 of the first resource 1012 of FIG. 10A) and the unused resources associated with the data-only traffic (e.g., the SCI portion 1026 of the third resource 1016 of FIG. 10A) may be reduced. For example, the first resource 1062 of the example of FIG. 10B multiplexes the SCI-only grant 1073 with data-only traffic in the data portion 1082 and, thus, facilitates reducing unused resources in the first slot 1052.

FIG. 10C depicts a table 1090 that illustrates the reservations signaled by an SCI in a first slot i, as presented herein. In the illustrated example of FIG. 10C, the SCI may include an SCI-only grant 1092, such as the example SCI-only grant 1073 of FIG. 10B. For example, the SCI-only grant 1092 may include SCI that is decoupled from the corresponding data with respect to a same slot. For example, the SCI and the corresponding SPS traffic may be included in different slots, such as the example SCI portion 1072 of the first resource 1062 and the data portion 1084 of the second resource 1064 of FIG. 10B. Similar to the example of FIG. 8, the SCI in the first slot i facilitates reserving three resources. Each of the reservations is for a same quantity of sub-channels (e.g., z sub-channels). However, the starting sub-channel may be different for any of the reservations.

As shown in FIG. 10C, the SCI-only grant 1092 may be received in the slot i. The SCI-only grant 1092 may facilitate scheduling SPS traffic. For example, the SCI-only grant 1092 may reserve a first resource at a slot i+a, may reserve a second resource at a slot i+x+a, and may reserve a third resource at a slot i+y+a. Thus, the start of the SPS traffic corresponding to the SCI-only grant 1092 is offset from the slot i by a quantity of slots (e.g., a slots). It may be appreciated that in some examples, the quantity of slots may be zero (e.g., a=0 slots). In such examples, the SCI and the SPS data may be similar to the example of FIG. 8 in which the data associated with the first reservation starts in the same slot as the SCI.

To indicate the starting time of the grant (e.g., slot i+a), disclosed techniques provide a time indicator to facilitate decoupling the SCI and the corresponding PSSCH (e.g., the SPS traffic) in the same slot so that the PSSCH corresponding to the SCI does not necessarily start right away (e.g., in the same slot). For example, the SCI-only grant may include the time indicator to indicate to the receiving sidelink UE that the SCI of the current slot is disassociated with the included data. That is, the time indicator may indicate that while the slot may include SCI and PSSCH, the SPS traffic corresponding to the SCI is located in another slot. Thus, aspects disclosed herein facilitate multiplexing SCI-only traffic with data-only traffic in a slot. For example, in the example of FIG. 10B, the data portion 1082 includes data-only traffic that is different than the data corresponding to the SCI included in the SCI portion 1072 of the first resource 1062. In some examples, the time indicator may be included with the SCI (e.g., SCI-1).

In some examples, the transmitting sidelink UE (e.g., the PLC) may include a traffic direction indicator to facilitate scheduling sidelink transmissions for both outbound traffic and inbound traffic. For example, the SCI-only grant may include the traffic direction indicator set to a first value (e.g., a "0") to indicate that the SCI-only grant is a forward-link grant, and set to a second value (e.g., a "1") to indicate that the SCI-only grant is a reverse-link grant. The traffic direction indicator may be included in the SCI (e.g., SCI-1 and/or SCI-2).

Multiplexing SCI-only grants and SPS traffic, for example, from a PLC to an SA, may facilitate reducing unused resources. For example, with respect to traffic from SAs to a PLC, event when the traffic is SPS-configured, SCI-only grants may useful for the PLC to schedule the retransmissions from the SA to the PLC. For example, the SA may be limited computing power or may be out of Uu coverage and unable to obtain a grant.

In some examples, a sidelink UE may schedule traffic between two different UEs. For example, and with respect to the example of FIG. 6, the PLC 604 may transmit an SCI-only grant to the first SA 606 and schedule a sidelink transmission between the first SA 606 and the second SA 608. In such examples, the SCI-only grant may include a source identifier (ID) and a destination ID to facilitate scheduling the future transmission. The source ID and the destination ID may be included in the first stage SCI (e.g., SCI-1) to identify the transmitting UE and the receiving UE associated with the future transmission. For example, in scenarios in which the UE receiving the SCI-only grant is not the transmitting UE of the future transmission (e.g., the SCI-only grant to the first SA 606 is scheduling the future traffic from the second SA 608 to the first SA 606), the source ID and the destination ID enable the SAs to prepare to transmit and receive the future traffic. That is, as the first stage SCI may be decodable by each of the SAs in communication with the PLC, including the source ID and the destination ID in the first stage SCI enables the respective UEs to determine when they are scheduled to transmit or to receive the future traffic. However, in examples in which the UE receiving the SCI-only grant is the transmitting UE of the future transmission, the source ID and the destination ID may be included in the second stage SCI (e.g., SCI-2).

Figure 11:
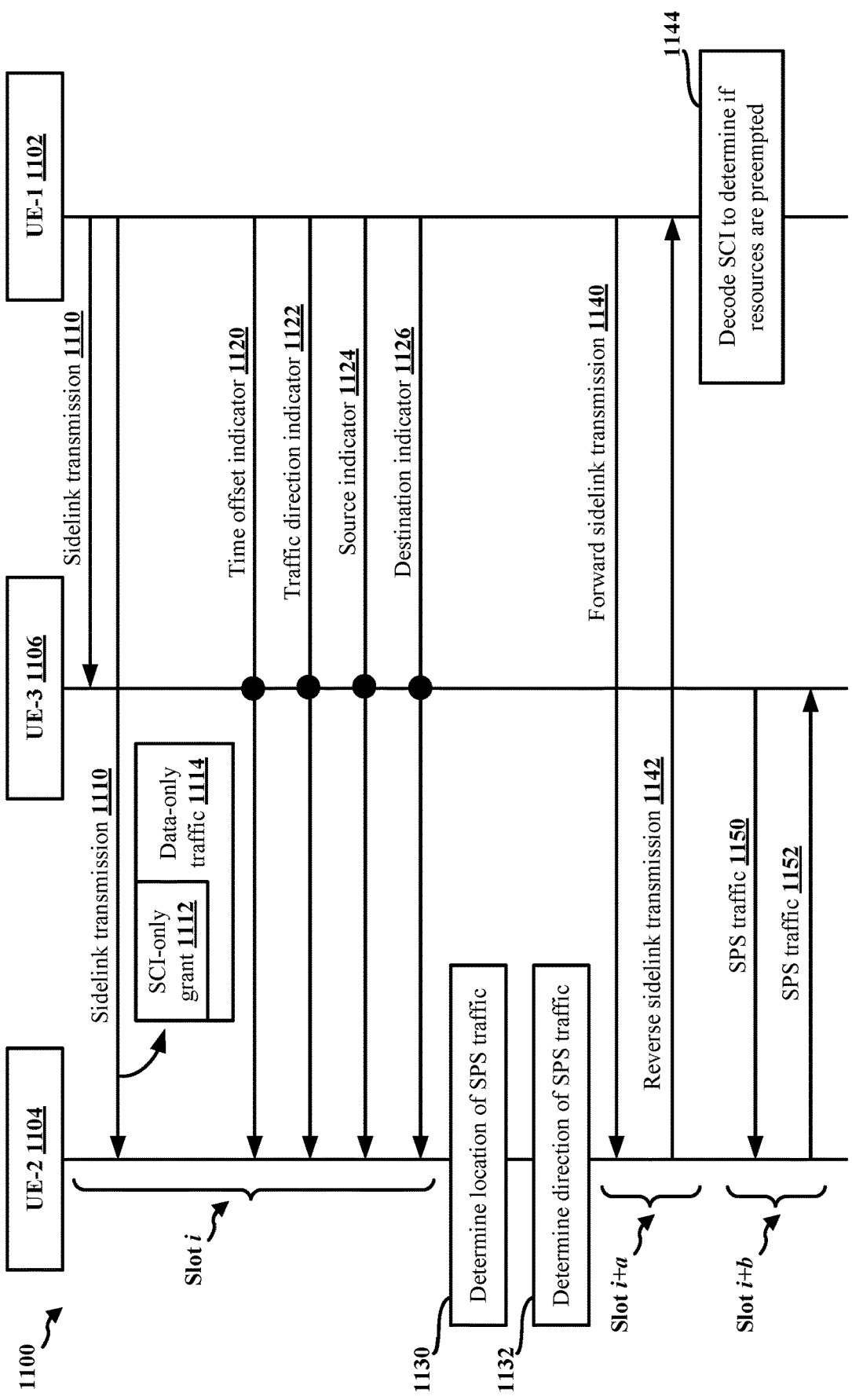
FIG. 11 is an example communication flow between a first UE, a second UE, and a third UE, in accordance with the teachings disclosed herein.

FIG. 11 illustrates an example communication flow 1100 between a first UE 1102 ("UE-1"), a second UE 1104 ("UE-2") and a third UE 1106 ("UE-3"), as presented herein. In the illustrated example, the communication flow 1100 facilitates multiplexing SCI-only grants and sidelink SPS traffic. Aspects of the UEs 1102, 1104, 1106 may be implemented by the UE 104 of FIG. 1 and/or the wireless communication devices 310, 350 of FIG. 3. In the illustrated example, the first UE 1102 may be implemented by a controller, such as the PLC 604 of FIG. 6, and the second UE 1104 and the third UE 1106 may be implemented by SAs, such as the SAs 606, 608, 610 of FIG. 6. Although not shown in the illustrated example of FIG. 11, it may be appreciated that in additional or alternative examples, one or more of the UEs 1102, 1104, 1106 may be in communication with one or more other base stations or UEs.

In the illustrated example of FIG. 11, the first UE 1102 may transmit an SCI-only grant on a slot that contains data-only traffic, such as the example first resource 1062 of FIG. 10B. As described above, transmitting an SCI-only grant in a slot may result in unused PSSCH resources that are wasted in the slot. Additionally, transmitting data-only traffic in a slot may result in unused SCI resources that are wasted in the slot. However, by decoupling the SCI and the corresponding PSSCH, as disclosed herein, a slot may include an SCI-only grant in the SCI portion of the slot and may also include data-only traffic in the PSSCH portion of the slot.

As shown in FIG. 11, the first UE 1102 transmits a sidelink transmission 1110 via sidelink that is received by the second UE 1104 and the third UE 1106. The sidelink transmission 1110 may be received at a slot i. The sidelink transmission 1110 includes an SCI-only grant 1112 and data-only traffic 1114. The SCI-only grant 1112 may be carried in PSCCH of the sidelink transmission 1110. The data-only traffic 1114 may be carried in PSSCH of the sidelink transmission 1110. Although not shown in the example of FIG. 11, it may be appreciated that the sidelink transmission 1110 may include additional channels and/or signals, such as a sidelink feedback channel.

The SCI-only grant 1112 facilitates reducing scheduling overhead at the SAs. For example, the SCI-only grant 1112 may enable the first UE 1102 to schedule traffic from the second UE 1104 to the first UE 1102 and, thus, remove the scheduling processing from the second UE 1104.

The data-only traffic 1114 facilitates reducing SCI processing overhead. For example, the data of the data-only traffic 1114 may be repetitive (e.g., a retransmission) and, thus, the SCI may be also be repetitive. The data-only traffic 1114 may enable the first UE 1102 to forego including SCI in the repetition and, thus, reduce SCI processing overhead at the second UE 1104 and/or the third UE 1106.

Although the second UE 1104 and the third UE 1106 may each receive the sidelink transmission 1110, the intended target of the sidelink transmission 1110, in the illustrated example, is the second UE 1104. That is, the first UE 1102 is scheduling SPS traffic with the second UE 1104.

As shown in FIG. 11, the first UE 1102 transmits a time offset indicator 1120 that is received by the second UE 1104. The time offset indicator 1120 indicates the starting time of the grant. For example, the time offset indicator 1120 may indicate when the corresponding SPS traffic is scheduled. A mapping between the time offset indicator 1120 and time resources may be configured via RRC signaling and/or upper layer signaling.

For example, and referring to the example of FIG. 10C, the table 1090 includes a column ("Slot") that indicates a starting slot associated with each of the reservations in the table 1090. As shown in FIG. 10C, each of the reservations is offset by a same quantity of slots (e.g., a slots). Thus, the first reservation starts at slot i+a. In such examples, the SCI may be received at the slot i, but the corresponding data is scheduled at slot i+a. In a similar manner, retransmissions of the corresponding data are scheduled for slot i+x+a and for slot i+y+a.

In some examples, the time offset indicator 1120 may include a value indicating a time gap. For example, the time offset indicator 1120 may be set to a value that indexes into a slot offset table. The table value at the time gap value may indicate the slot offset. For example, and referring to the example table 1090 of FIG. 10C, the time offset indicator 1120 may be set to a time gap value and the table value at the time gap value may be a slots. The slot offset table may be configured via upper layer signaling.

In some examples, the time offset indicator 1120 may include a bitmap. In some examples, the bitmap may be a fixed-length bitmap. The bitmap may facilitate indicating the time at which the future traffic is scheduled.

Although shown as a separate transmission from the first UE 1102 to the second UE 1104, it may be appreciated that the time offset indicator 1120 may be included in the sidelink transmission 1110. For example, the time offset indicator 1120 may be included in the first stage SCI (SCI-1) of the sidelink transmission 1110.

In the illustrated example, the first UE 1102 transmits a traffic direction indicator 1122 that is received by the second UE 1104. The traffic direction indicator 1122 indicates the traffic direction of the SPS traffic indicated by the SCI-only grant 1112. For example, the traffic direction indicator 1122 may indicate that the SCI-only grant 1112 corresponds to a forward-link grant scheduling SPS traffic from the first UE 1102 to the second UE 1104, or may indicate that the SCI-only grant 1112 corresponds to a reverse-link grant scheduling SPS traffic from the second UE 1104 to the first UE 1102.

In some examples, the traffic direction indicator 1122 may be an implicit indication. For example, and referring to the example second stage SCI 950 of FIG. 9B, the second stage SCI of the sidelink transmission 1110 may include a source ID field and a destination ID field. Thus, the second UE 1104 receiving the second stage SCI may determine the direction of the SPS traffic based on the indicated source ID and the indicated destination ID.

In some examples, the traffic direction indicator 1122 may include a field of the SCI. For example, the traffic direction indicator 1122 may be set to a first value (e.g., a "0") to indicate that the SPS traffic being scheduled by the SCI-only grant 1112 corresponds to a forward-link grant, and may be set to a second value (e.g., a "1") to indicate that the SPS traffic being scheduled by the SCI-only grant 1112 corresponds to a reverse-link grant.

Although shown as a separate transmission from the first UE 1102 to the second UE 1104, it may be appreciated that the traffic direction indicator 1122 may be included in the sidelink transmission 1110. For example, the traffic direction indicator 1122 may be included in the first stage SCI (SCI-1) or the second stage SCI (SCI-2) of the sidelink transmission 1110.

At 1130, the second UE 1104 may determine the location of the SPS traffic being scheduled by the SCI-only grant 1112. For example, the second UE 1104 may use the time offset indicator 1120 to determine the starting slot of the SPS traffic. The time offset indicator 1120 may indicate that the starting slot of the SPS traffic is a future resource (e.g., at slot i+a). However, it some examples, the time offset indicator 1120 may indicate that the starting slot of the SPS traffic is the current slot (e.g., slot i). For example, the time offset indicator 1120 may indicate an offset of 0 slots (e.g., a=0 slots). In such examples, the SCI and the SPS traffic are coupled.

At 1132, the second UE 1104 may determine the direction of the SPS traffic being scheduled by the SCI-only grant 1112. For example, the second UE 1104 may use the traffic direction indicator 1122 to determine whether the SCI-only grant 1112 corresponds to a forward-link grant or a reverse-link grant.

As shown in FIG. 11, the first UE 1102 and the second UE 1104 may then communicate at a slot i+a based on the SCI-only grant 1112 of the sidelink transmission 1110. The location of the slot i+a may be indicated by the time offset indicator 1120. Additionally, the direction of the SPS traffic at the slot i+a may be indicated by the traffic direction indicator 1122. For example, if the traffic direction indicator 1122 indicates that the SCI-only grant 1112 corresponds to a forward-link grant, then the first UE 1102 may transmit a forward sidelink transmission 1140 that is received by the second UE 1104. The forward sidelink transmission 1140 may include the PSSCH data scheduled by the SCI-only grant 1112. The forward sidelink transmission 1140 may also include SCI associated with the PSSCH data.

In examples in which the traffic direction indicator 1122 indicates that the SCI-only grant 1112 corresponds to a reverse-link grant, then the second UE 1104 may transmit a reverse sidelink transmission 1142 that is received by the first UE 1102.

At 1144, the first UE 1102 may decode the SCI (e.g., the SCI-1 and the SCI-2) to determine if the sources are preempted by higher-priority traffic. For example, the resources of the reverse sidelink transmission 1142 may overlap with URLLC traffic with a higher priority level. In such examples, the first UE 1102 may discard the overlapping resources of the reverse sidelink transmission 1142.

In some examples, the sidelink transmission 1110 may multiplex information targeted at different UEs. For example, the SCI-only grant 1112 of the sidelink transmission 1110 may be directed to the second UE 1104 and the data-only traffic 1114 of the sidelink transmission 1110 may be directed to the third UE 1106.

In some examples, the sidelink transmission 1110 may facilitate scheduling SPS traffic between the second UE 1104 and the third UE 1106. For example, the SCI-only grant 1112 may indicate resources for the second UE 1104 to use to transmit to the third UE 1106 or for the third UE 1106 to use to transmit to the second UE 1104.

To facilitate multiplexing the information targeted at the different UEs, the first UE 1102 may transmit the time offset indicator 1120 to indicate the starting slot of the SPS traffic. The first UE 1102 may also transmit source and destinations indicators. For example, the first UE 1102 may transmit a source indicator 1124 and a destination indicator 1126. The source indicator 1124 may include a source identifier (ID) and indicate the transmitting device of the SPS traffic. The destination indicator 1126 may include a destination ID and indicate the receiving device of the SPS traffic.

The first UE 1102 may transmit the source indicator 1124 and the destination indicator 1126 via the first stage SCI (SCI-1). In some examples, the first UE 1102 may include the source indicator 1124 and the destination indicator 1126 when the transmitting device of the SPS traffic is different than the target of the sidelink transmission 1110. For example, the SCI-only grant 1112 may schedule the third UE 1106 to transmit SPS traffic to the second UE 1104 at a slot i+b. In such examples, the first UE 1102 may include the offset indicator 1120 with the SCI-only grant 1112 so that the second UE 1104 and the third UE 1106 may determine the location of the SPS traffic. The first UE 1102 may also include the source indicator 1124 and the destination indicator 1126 so that the second UE 1104 and the third UE 1106 are able to configure themselves to transmit and receive the SPS traffic. At the future resource indicated by the SCI-only grant 1112 (e.g., the slot i+b), the third UE 1106 may transmit SPS traffic 1150 that is received by the second UE 1104.

In some examples, the source indicator 1124 and the destination indicator 1126 may be similar to the source ID and the destination ID included in the second stage SCI, as shown in the second stage SCI 950 of FIG. 9B. For example, the first UE 1102 may duplicate the source ID of the second stage SCI as the source indicator 1124 in the first stage SCI. The first UE 1102 may also duplicate the destination ID of the second stage SCI as the destination indicator 1126 in the first stage SCI.

In examples in which the transmitting device of the SPS is the same as the target of the sidelink transmission 1110, the first UE 1102 may forego including the source indicator 1124 and the destination indicator 1126 with the SCI-only grant 1112. For example, the SCI-only grant 1112 may schedule the second UE 1104 to transmit SPS traffic to the third UE 1106 at the slot i+b. In such examples, the first UE 1102 may transmit the time offset indicator 1120 in the SCI-only grant 1112 so that the second UE 1104 and the third UE 1106 may determine the location of the SPS traffic. In some examples, the first UE 1102 may include the source indicator 1124 and the destination indicator 1126 in the second stage SCI of the sidelink transmission 1110. Additionally, the second UE 1104 may include the source indicator 1124 and the destination indicator 1126 in the second stage SCI of the future data. For example, at the future resource indicated by the SCI-only grant 1112 (e.g., the slot i+b), the second UE 1104 may transmit SPS traffic 1152 that is received by the third UE 1106. The SPS traffic 1152 may include the source indicator 1124 and the destination indicator 1126, as shown in the example second stage SCI 950 of FIG. 9B.

Figure 12:
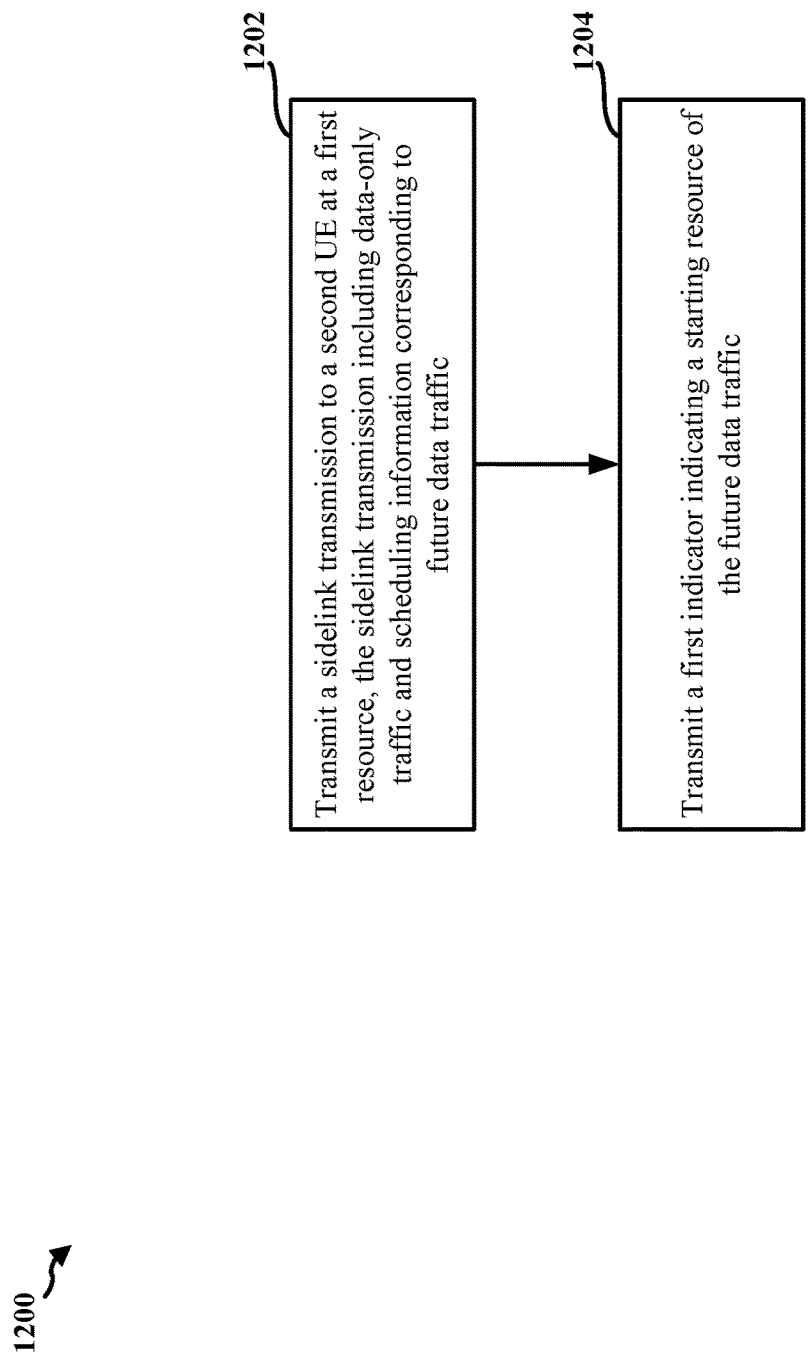
FIG. 12 is a flowchart of a method of wireless communication at a first, in accordance with the teachings disclosed herein.

FIG. 12 is a flowchart 1200 of a method of wireless communication. The method may be performed by a first UE (e.g., the UE 104, the communication devices 310, 350, the first UE 1102 of FIG. 11, and/or an apparatus 1402 of FIG. 14). The method may facilitate improving communication performance by multiplexing SCI-only grants and data-only SPS traffic on sidelink.

At 1202, the first UE transmits a sidelink transmission to a second UE at a first resource, the sidelink transmission including data-only traffic and scheduling information corresponding to future data traffic, as described in connection with the sidelink transmission 1110 of FIG. 11. In some examples, the data-only traffic may be directed to the second UE. In some examples, the data-only traffic may be directed to a third UE. The transmitting of the sidelink transmission, at 1202, may be performed by a sidelink transmission component 1440 of the apparatus 1402 of FIG. 14.

At 1204, the first UE transmits a first indicator indicating a starting resource of the future data traffic, as described in connection with the time offset indicator 1120 of FIG. 11. The first UE may transmit the first indicator using first stage SCI of the sidelink transmission. The transmitting of the first indicator, at 1204, may be performed by a time offset component 1442 of the apparatus 1402 of FIG. 14.

In some examples, the starting resource may be different than the first resource. In such examples, the SCI of the sidelink transmission may be decoupled from the data-only traffic of the sidelink transmission. In some examples, the first indicator may include a time gap value that indexes to the starting resource. In some examples, the first indicator may include a bitmap that indicates the starting resource.

Figure 13:
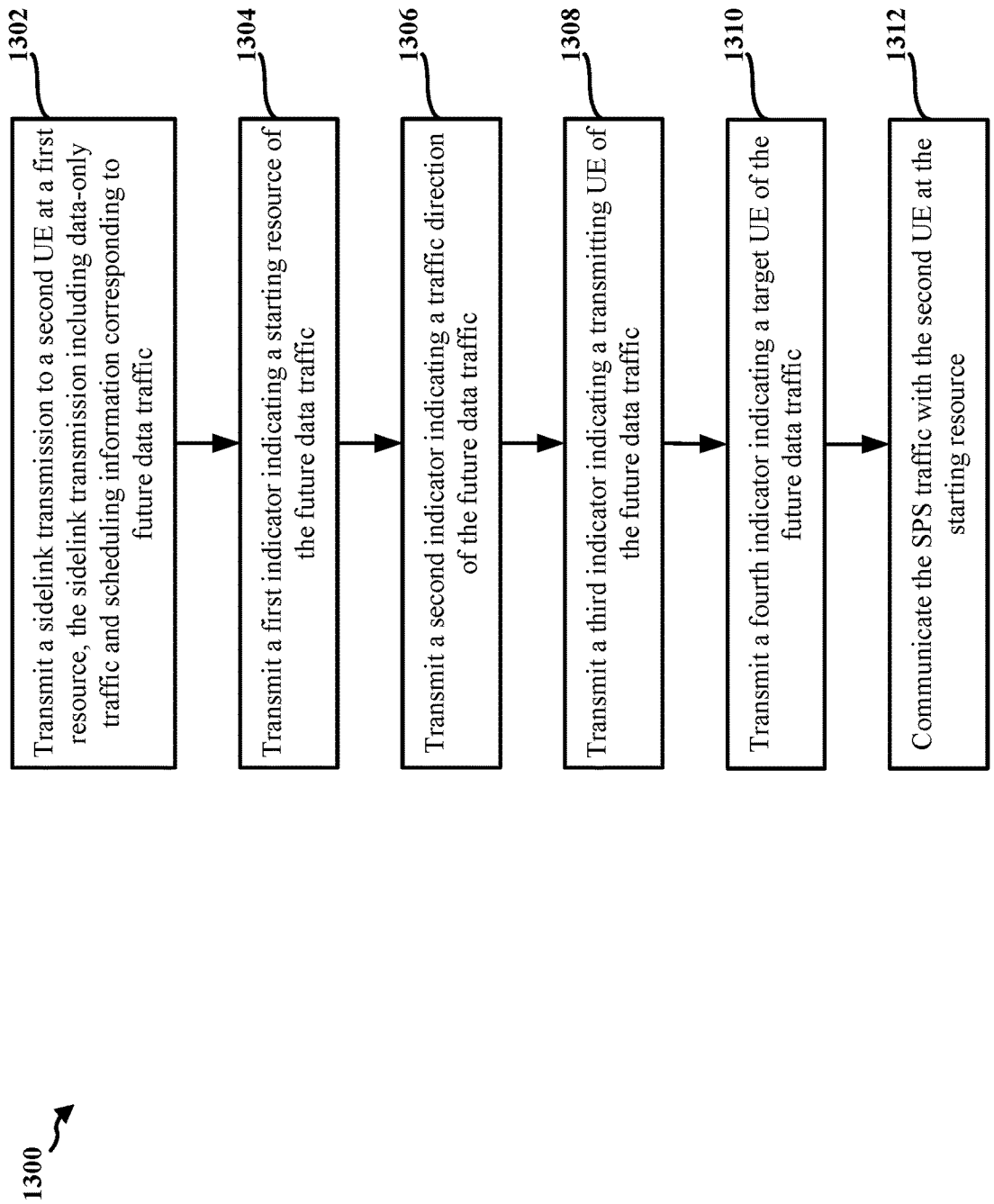
FIG. 13 is a flowchart of a method of wireless communication at a first UE, in accordance with the teachings disclosed herein.

FIG. 13 is a flowchart 1300 of a method of wireless communication. The method may be performed by a first UE (e.g., the UE 104, the communication devices 310, 350, the first UE 1102 of FIG. 11, and/or an apparatus 1402 of FIG.

14). The method may facilitate improving communication performance by multiplexing SCI-only grants and data-only SPS traffic on sidelink.

At 1302, the first UE transmits a sidelink transmission to a second UE at a first resource, the sidelink transmission including data-only traffic and scheduling information corresponding to future data traffic, as described in connection with the sidelink transmission 1110 of FIG. 11. In some examples, the data-only traffic may be directed to the second UE. In some examples, the data-only traffic may be directed to a third UE. The transmitting of the sidelink transmission, at 1302, may be performed by a sidelink transmission component 1440 of the apparatus 1402 of FIG. 14.

At 1304, the first UE transmits a first indicator indicating a starting resource of the future data traffic, as described in connection with the time offset indicator 1120 of FIG. 11. The first UE may transmit the first indicator using first stage SCI of the sidelink transmission. The transmitting of the first indicator, at 1304, may be performed by a time offset component 1442 of the apparatus 1402 of FIG. 14.

In some examples, the starting resource may be different than the first resource. In such examples, the SCI of the sidelink transmission may be decoupled from the data-only traffic of the sidelink transmission. In some examples, the first indicator may include a time gap value that indexes to the starting resource. In some examples, the first indicator may include a bitmap that indicates the starting resource.

At 1306, the first UE may transmit a second indicator indicating a traffic direction of the future data traffic, as described in connection with the traffic direction indicator 1122 of FIG. 11. The first UE may transmit the second indicator using first stage SCI or second stage SCI of the sidelink transmission. The transmitting of the second indicator, at 1306, may be performed by a traffic direction component 1444 of the apparatus 1402 of FIG. 14.

In some examples, the second indicator may include a source identifier of the future data traffic and a destination identifier of the future data traffic. In some examples, the second indicator may include a field, a first value of the field indicating that the future data traffic is from the first UE to the second UE, and a second value of the field indicating that the future data traffic is from the second UE to the first UE.

At 1308, the first UE may transmit a third indicator indicating a transmitting UE of the future data traffic, as described in connection with the source indicator 1124 of FIG. 11. The transmitting of the third indicator, at 1308, may be performed by a source component 1446 of the apparatus 1402 of FIG. 14.

At 1310, the first UE may transmit a fourth indicator indicating a target UE of the future data traffic, as described in connection with the destination indicator 1126 of FIG. 11. The transmitting of the fourth indicator, at 1310, may be performed by a destination component 1448 of the apparatus 1402 of FIG. 14.

In some examples, the transmitting UE may be different than the second UE. In some such examples, the first UE may transmit the third indicator (e.g., at 1308) and the fourth indicator (e.g., at 1310) using first stage SCI of the sidelink transmission.

In some examples, the transmitting UE may be the second UE. In some such examples, the first UE may transmit the third indicator (e.g., at 1308) and the fourth indicator (e.g., at 1310) using second stage SCI of the sidelink transmission.

In some examples, the future data traffic may include SPS traffic. For example, at 1312, the first UE may communicate SPS traffic with the second UE at the starting resource, as described in connection with the forward sidelink transmission 1140 and/or the reverse sidelink transmission 1142 of FIG. 11. The communicating of the SPS traffic with the second UE, at 1312, may be performed by an SPS component 1450 of the apparatus 1402 of FIG. 14.

Figure 14:
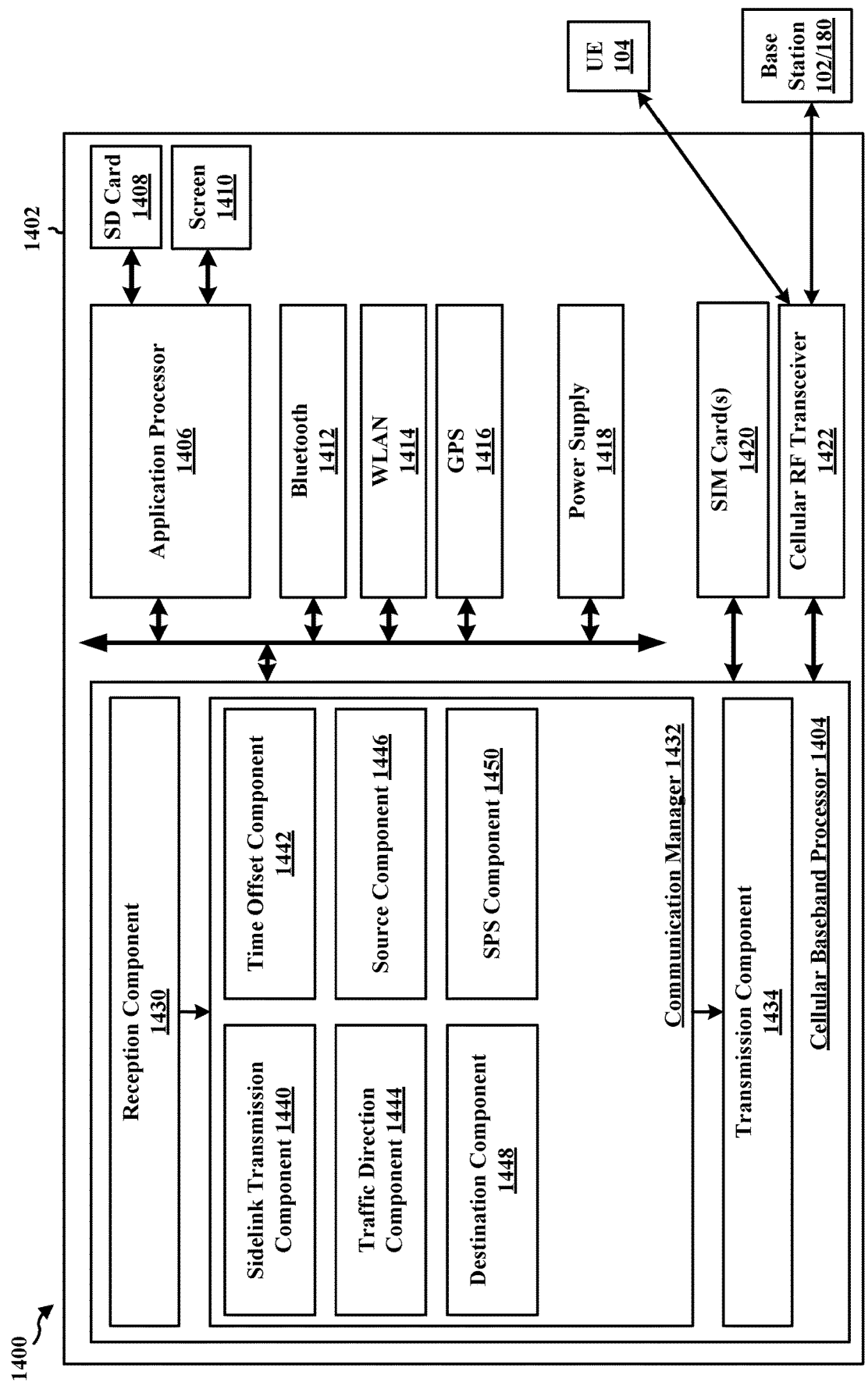
FIG. 14 is a diagram illustrating an example of a hardware implementation for an example apparatus, in accordance with the teachings disclosed herein.

FIG. 14 is a diagram 1400 illustrating an example of a hardware implementation for an apparatus 1402. The apparatus 1402 may be a UE, or another device configured to transmit and/or receive sidelink communication. The apparatus 1402 includes a baseband processor 1404 (also referred to as a modem) coupled to a RF transceiver 1422. In some aspects, the baseband processor 1404 may be a cellular baseband processor and/or the RF transceiver 1422 may be a cellular RF transceiver. The apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The baseband processor 1404 communicates through the RF transceiver 1422 with the UE 104 and/or the base station 102/180. The baseband processor 1404 may include a computer-readable medium/memory. The computer-readable medium/memory may be non-transitory. The baseband processor 1404 is responsible for general processing, including the execution of software stored on the computer-readable medium/memory. The software, when executed by the baseband processor 1404, causes the baseband processor 1404 to perform the various functions described in the present application. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the second wireless communication device 350 and may include the memory 359 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see the second wireless communication device 350 of FIG. 3) and include the additional modules of the apparatus 1402.

The communication manager 1432 includes a sidelink transmission component 1440 that is configured to transmit a sidelink transmission to a second UE at a first resource, the sidelink transmission including data-only traffic and scheduling information corresponding to future data traffic, for example, as described in connection with 1202 of FIG. 12 and/or 1302 of FIG. 13.

The communication manager 1432 also includes a time offset component 1442 that is configured to transmit a first indicator indicating a starting resource of the future data traffic, for example, as described in connection with 1204 of FIG. 12 and/or 1304 of FIG. 13.

The communication manager 1432 also includes a traffic direction component 1444 that is configured to transmit a second indicator indicating a traffic direction of the future data traffic, for example, as described in connection with 1306 of FIG. 13.

The communication manager 1432 also includes a source component 1446 that is configured to transmit a third indicator indicating a transmitting UE of the future data traffic, for example, as described in connection with 1308 of FIG. 13.

The communication manager 1432 also includes a destination component 1448 that is configured to transmit a fourth indicator indicating a target UE of the future data traffic, for example, as described in connection with 1310 of FIG. 13.

The communication manager 1432 also includes an SPS component 1450 that is configured to communicate the SPS traffic with the second UE at the starting resource, for example, as described in connection with 1312 of FIG. 13.

The apparatus may include additional components that perform each of the blocks of the algorithm in the flowcharts of FIGS. 12 and/or 13. As such, each block in the flowcharts of FIGS. 12 and/or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband processor 1404, includes means for transmitting a sidelink transmission to a second UE at a first resource, the sidelink transmission including data-only traffic and scheduling information corresponding to future data traffic. The example apparatus 1402 also includes means for transmitting a time offset indicator indicating a starting resource of the future data traffic.

In another configuration, the example apparatus 1402 also includes means for transmitting the time offset indicator using first stage sidelink control information of the sidelink transmission.

In another configuration, the example apparatus 1402 also includes means for transmitting a traffic direction indicator indicating a traffic direction of the future data traffic.

In another configuration, the example apparatus 1402 also includes means for transmitting the traffic direction indicator using first stage SCI or second stage SCI of the sidelink transmission.

In another configuration, the example apparatus 1402 also includes means for transmitting a source indicator indicating a transmitting UE of the future data traffic. The example apparatus 1402 also includes means for transmitting a destination indicator indicating a target UE of the future data traffic.

In another configuration, the example apparatus 1402 also includes means for transmitting the source indicator and the destination indicator using first stage sidelink control information of the sidelink transmission.

In another configuration, the example apparatus 1402 also includes means for transmitting the source indicator and the destination indicator using second stage sidelink control information of the sidelink transmission.

In another configuration, the example apparatus 1402 also includes means for communicating the SPS traffic with the second UE at the starting resource.

The means may be one or more of the components of the apparatus 1402 configured to perform the functions recited by the means. As described supra, the apparatus 1402 may include the TX processor 368, the RX processor 356, and the controller/processor 359. As such, in one configuration, the means may be the TX processor 368, the RX processor 356, and the controller/processor 359 configured to perform the functions recited by the means.

Figure 15:
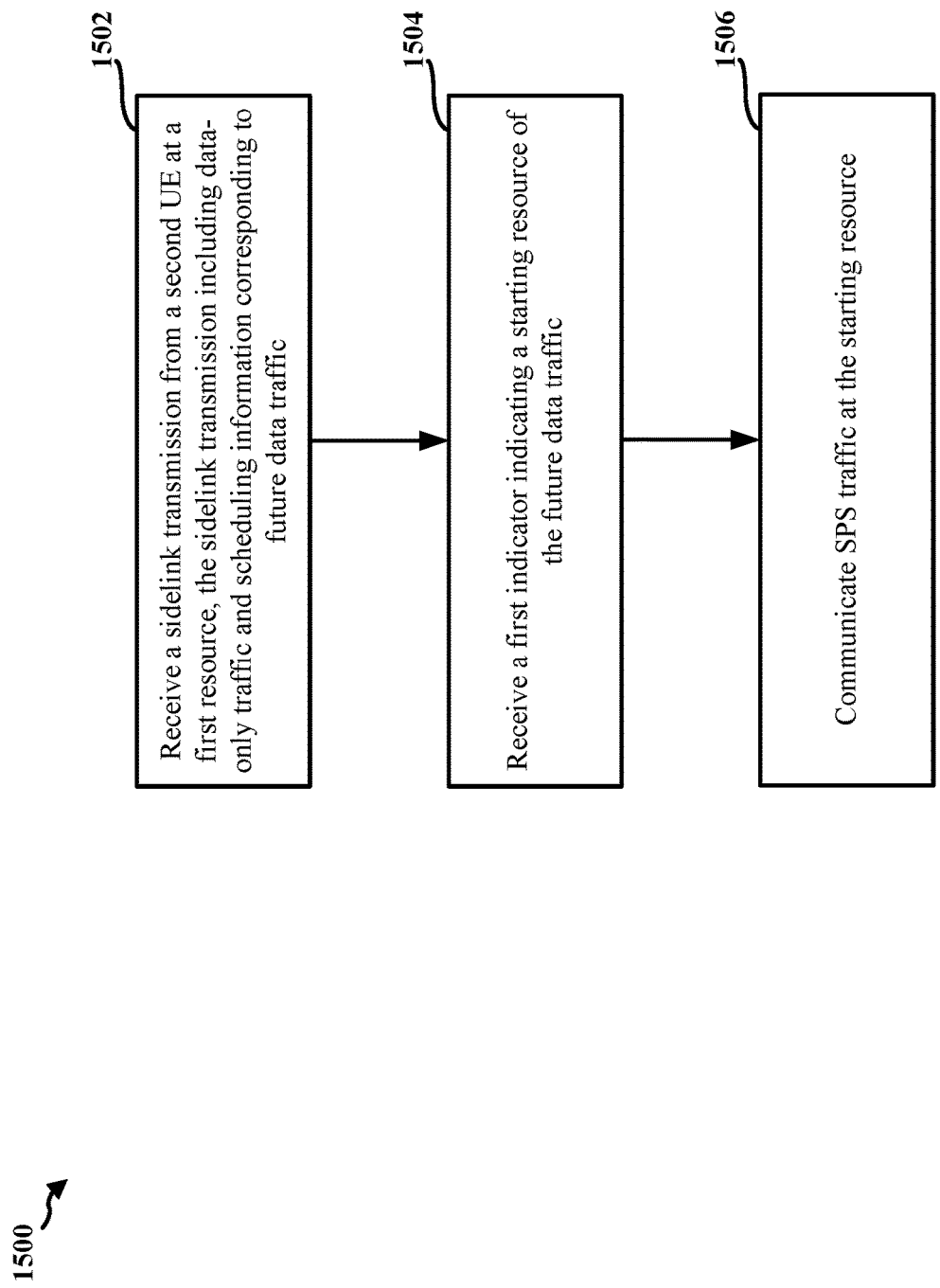
FIG. 15 is a flowchart of a method of wireless communication at a first UE, in accordance with the teachings disclosed herein.

FIG. 15 is a flowchart 1500 of a method of wireless communication. The method may be performed by a first UE (e.g., the UE 104, the communication devices 310, 350, the second UE 1104 of FIG. 11, and/or an apparatus 1702 of FIG. 17). The method may facilitate improving communication performance by multiplexing SCI-only grants and data-only SPS traffic on sidelink.

At 1502, the first UE receives a sidelink transmission from a second UE at a first resource, the sidelink transmission including data-only traffic and scheduling information corresponding to future data traffic, as described in connection with the sidelink transmission 1110 of FIG. 11. In some examples, the data-only traffic may be directed to the first UE. In some examples, the data-only traffic may be directed to a third UE. The receiving of the sidelink transmission, at 1502, may be performed by a sidelink transmission component 1740 of the apparatus 1702 of FIG. 17.

At 1504, the first UE receives a first indicator indicating a starting resource of the future data traffic, as described in connection with the time offset indicator 1120 of FIG. 11. The first UE may receive the first indicator in first stage SCI of the sidelink transmission. The receiving of the first indicator, at 1504, may be performed by a time offset component 1742 of the apparatus 1702 of FIG. 17.

In some examples, the starting resource may be different than the first resource. In such examples, the SCI of the sidelink transmission may be decoupled from the data-only traffic of the sidelink transmission. In some examples, the first indicator may include a time gap value that indexes to the starting resource. In some examples, the first indicator may include a bitmap that indicates the starting resource.

At 1506, the first UE communicates SPS traffic at the starting resource, the future data traffic including the SPS traffic, as described in connection with the forward sidelink transmission 1140, the reverse sidelink transmission 1142, SPS traffic 1150, and/or the SPS traffic 1152 of FIG. 11. The communicating of the SPS traffic at the starting resource, at 1506, may be performed by an SPS component 1750 of the apparatus 1702 of FIG. 17.

In some examples, the first UE communicates the SPS traffic at the starting resource with the second UE. For example, the first UE may receive the forward sidelink transmission 1140 or may transmit the reverse sidelink transmission 1142 of FIG. 11.

In some examples, the first UE communicates the SPS traffic at the starting resource with a third UE different than the second UE. For example, the first UE may receive the SPS traffic 1150 or may transmit the SPS traffic 1152 of FIG. 11.

Figure 16:
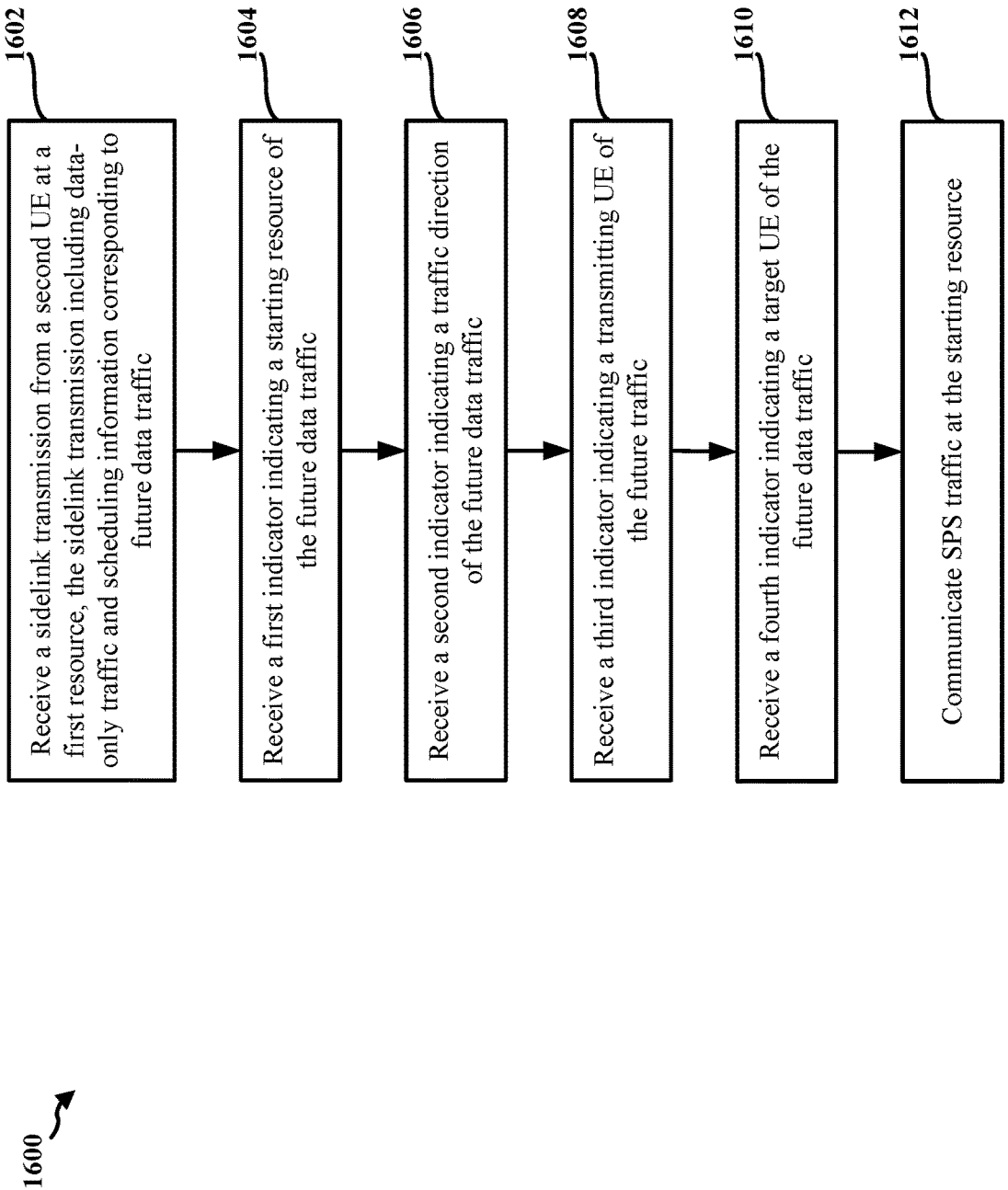
FIG. 16 is a flowchart of a method of wireless communication at a first UE, in accordance with the teachings disclosed herein.

FIG. 16 is a flowchart 1600 of a method of wireless communication. The method may be performed by a first UE (e.g., the UE 104, the communication devices 310, 350, the second UE 1104 of FIG. 11, and/or an apparatus 1702 of FIG. 17). The method may facilitate improving communication performance by multiplexing SCI-only grants and data-only SPS traffic on sidelink.

At 1602, the first UE receives a sidelink transmission from a second UE at a first resource, the sidelink transmission including data-only traffic and scheduling information corresponding to future data traffic, as described in connection with the sidelink transmission 1110 of FIG. 11. In some examples, the data-only traffic may be directed to the first UE. In some examples, the data-only traffic may be directed to a third UE. The receiving of the sidelink transmission, at 1602, may be performed by a sidelink transmission component 1740 of the apparatus 1702 of FIG. 17.

At 1604, the first UE receives a first indicator indicating a starting resource of the future data traffic, as described in connection with the time offset indicator 1120 of FIG. 11. The first UE may receive the first indicator in first stage SCI of the sidelink transmission. The receiving of the first indicator, at 1604, may be performed by a time offset component 1742 of the apparatus 1702 of FIG. 17.

In some examples, the starting resource may be different than the first resource. In such examples, the SCI of the sidelink transmission may be decoupled from the data-only traffic of the sidelink transmission. In some examples, the first indicator may include a time gap value that indexes to the starting resource. In some examples, the first indicator may include a bitmap that indicates the starting resource.

At 1606, the first UE may receive a second indicator indicating a traffic direction of the future data traffic, as described in connection with the traffic direction indicator 1122 of FIG. 11. The first UE may receive the second indicator in first stage SCI or second stage SCI of the sidelink transmission. The receiving of the second indicator, at 1606, may be performed by a traffic direction component 1744 of the apparatus 1702 of FIG. 17.

In some examples, the second indicator may include a source identifier of the future data traffic and a destination identifier of the future data traffic. In some examples, the second indicator may include a field, a first value of the field indicating that the future data traffic is from the second UE to the first UE, and a second value of the field indicating that the future data traffic is from the first UE to the second UE.

At 1608, the first UE may receive a third indicator indicating a transmitting UE of the future data traffic, as described in connection with the source indicator 1124 of FIG. 11. The receiving of the third indicator, at 1608, may be performed by a source component 1746 of the apparatus 1702 of FIG. 17.

At 1610, the first UE may receive a fourth indicator indicating a target UE of the future data traffic, as described in connection with the destination indicator 1126 of FIG. 11. The receiving of the fourth indicator, at 1610, may be performed by a destination component 1748 of the apparatus 1702 of FIG. 17.

In some examples, the transmitting UE may be different than the first UE. In some such examples, the first UE may receive the third indicator (e.g., at 1608) and the fourth indicator (e.g., at 1610) in first stage SCI of the sidelink transmission.

In some examples, the transmitting UE may be the first UE. In some such examples, the first UE may receive the third indicator (e.g., at 1608) and the fourth indicator (e.g., at 1610) in second stage SCI of the sidelink transmission.

At 1612, the first UE communicates SPS traffic at the starting resource, the future data traffic including the SPS traffic, as described in connection with the forward sidelink transmission 1140, the reverse sidelink transmission 1142, SPS traffic 1150, and/or the SPS traffic 1152 of FIG. 11. The communicating of the SPS traffic at the starting resource, at 1612, may be performed by an SPS component 1750 of the apparatus 1702 of FIG. 17.

In some examples, the first UE communicates the SPS traffic at the starting resource with the second UE. For example, the first UE may receive the forward sidelink transmission 1140 or may transmit the reverse sidelink transmission 1142 of FIG. 11.

In some examples, the first UE communicates the SPS traffic at the starting resource with a third UE different than the second UE. For example, the first UE may receive the SPS traffic 1150 or may transmit the SPS traffic 1152 of FIG. 11.

Figure 17:
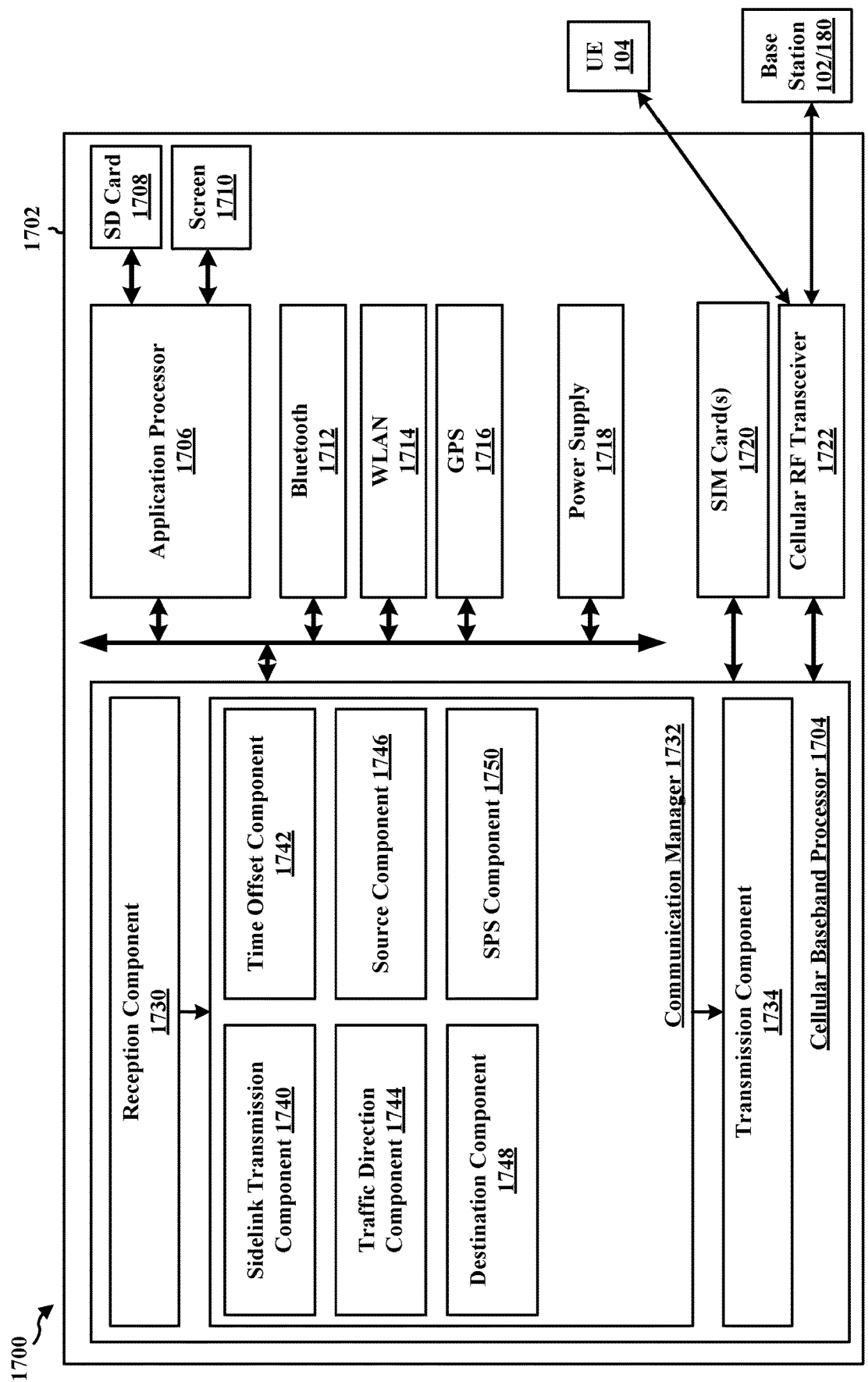
FIG. 17 is a diagram illustrating an example of a hardware implementation for an example apparatus, in accordance with the teachings disclosed herein.

FIG. 17 is a diagram 1700 illustrating an example of a hardware implementation for an apparatus 1702. The apparatus 1702 may be a UE, or another device configured to transmit and/or receive sidelink communication. The apparatus 1702 includes a baseband processor 1704 (also referred to as a modem) coupled to a RF transceiver 1722. In some aspects, the baseband processor 1704 may be a cellular baseband processor and/or the RF transceiver 1722 may be a cellular RF transceiver. The apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and/or a power supply 1718. The baseband processor 1704 communicates through the RF transceiver 1722 with the UE 104 and/or the base station 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described in the present application. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the second wireless communication device 350 and may include the memory 359 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see the second wireless communication device 350 of FIG. 3) and include the additional modules of the apparatus 1702.

The communication manager 1732 includes a sidelink transmission component 1740 that is configured to receive a sidelink transmission from a second UE at a first resource, the sidelink transmission including data-only traffic and scheduling information corresponding to future data traffic, for example, as described in connection with 1502 of FIG. 15 and/or 1602 of FIG. 16.

The communication manager 1732 also includes a time offset component 1742 that is configured to receive a first indicator indicating a starting resource of the future data traffic, for example, as described in connection with 1504 of FIG. 15 and/or 1604 of FIG. 16.

The communication manager 1732 also includes a traffic direction component 1744 that is configured to receive a second indicator indicating a traffic direction of the future data traffic, for example, as described in connection with 1606 of FIG. 16.

The communication manager 1732 also includes a source component 1746 that is configured to receive a third indicator indicating a transmitting UE of the future data traffic, for example, as described in connection with 1608 of FIG. 16.

The communication manager 1732 also includes a destination component 1748 that is configured to receive a fourth indicator indicating a target UE of the future data traffic, for example, as described in connection with 1610 of FIG. 16.

The communication manager 1732 also includes an SPS component 1750 that is configured to communicate SPS traffic at the starting resource, the future data traffic including the SPS traffic, for example, as described in connection with 1506 of FIG. 15 and/or 1612 of FIG. 16.

The apparatus may include additional components that perform each of the blocks of the algorithm in the flowcharts of FIGS. 15 and/or 16. As such, each block in the flowcharts of FIGS. 15 and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband processor 1704, includes means for receiving a sidelink transmission from a second UE at a first resource, the sidelink transmission including data-only traffic and scheduling information corresponding to future data traffic. The example apparatus 1702 also includes means for receiving a first indicator indicating a starting resource of the future data traffic. The example apparatus 1702 also includes means for communicating SPS traffic at the starting resource, the future data traffic including the SPS traffic.

In another configuration, the example apparatus 1702 also includes means for receiving the first indicator in first stage sidelink control information of the sidelink transmission.

In another configuration, the example apparatus 1702 also includes means for receiving a second indicator indicating a traffic direction of the future data traffic.

In another configuration, the example apparatus 1702 also includes means for receiving the second indicator in first stage SCI or second stage SCI of the sidelink transmission.

In another configuration, the example apparatus 1702 also includes means for receiving a third indicator indicating a transmitting UE of the future data traffic. The example apparatus 1702 also includes means for receiving a fourth indicator indicating a target UE of the future data traffic.

In another configuration, the example apparatus 1702 also includes means for receiving the third indicator and the fourth indicator in first stage sidelink control information of the sidelink transmission.

In another configuration, the example apparatus 1702 also includes means for receiving the third indicator and the fourth indicator in second stage sidelink control information of the sidelink transmission.

In another configuration, the example apparatus 1702 also includes means for communicating the SPS traffic at the starting resource with the second UE.

In another configuration, the example apparatus 1702 also includes means for communicating the SPS traffic at the starting resource with a third UE different than the second UE.

The means may be one or more of the components of the apparatus 1702 configured to perform the functions recited by the means. As described supra, the apparatus 1702 may include the TX processor 368, the RX processor 356, and the controller/processor 359. As such, in one configuration, the means may be the TX processor 368, the RX processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first UE, comprising:

transmitting a sidelink transmission to a second UE at a first resource, the sidelink transmission including data-only traffic and scheduling information corresponding to future data traffic; and transmitting a time offset indicator indicating a starting resource of the future data traffic.

Aspect 2 is the method of aspect 1, further including that the starting resource is different than the first resource.

Aspect 3 is the method of any of aspects 1 and 2, further including that the time offset indicator includes a time gap value that indexes to the starting resource.

Aspect 4 is the method of any of aspects 1 to 3, further including that the time offset indicator includes a bitmap that indicates the starting resource.

Aspect 5 is the method of any of aspects 1 to 4, further including that the first UE transmits the time offset indicator using first stage sidelink control information of the sidelink transmission.

Aspect 6 is the method of any of aspects 1 to 5, further including: transmitting a traffic direction indicator indicating a traffic direction of the future data traffic.

Aspect 7 is the method of any of aspects 1 to 6, further including that the traffic direction indicator includes a source identifier of the future data traffic and a destination identifier of the future data traffic.

Aspect 8 is the method of any of aspects 1 to 7, further including that the traffic direction indicator includes a field, a first value of the field indicating that the future data traffic is from the first UE to the second UE, and a second value of the field indicating that the future data traffic is from the second UE to the first UE.

Aspect 9 is the method of any of aspects 1 to 8, further including that the first UE transmits the traffic direction indicator using first stage SCI or second stage SCI of the sidelink transmission.

Aspect 10 is the method of any of aspects 1 to 9, further including: transmitting a source indicator indicating a transmitting UE of the future data traffic; and transmitting a destination indicator indicating a target UE of the future data traffic.

Aspect 11 is the method of any of aspects 1 to 10, further including that the transmitting UE is different than the second UE, and the first UE transmits the source indicator and the destination indicator using first stage sidelink control information of the sidelink transmission.

Aspect 12 is the method of any of aspects 1 to 10, further including that the transmitting UE is the second UE, and the first UE transmits the source indicator and the destination indicator using second stage sidelink control information of the sidelink transmission.

Aspect 13 is the method of any of aspects 1 to 12, further including that the future data traffic comprises SPS traffic, the method further comprising: communicating the SPS traffic with the second UE at the starting resource.

Aspect 14 is the method of any of aspects 1 to 13, further including that the data-only traffic is directed to a third UE different than the second UE.

Aspect 15 is an apparatus for wireless communication including at least one processor coupled to a memory and configured to implement any of aspects 1 to 14

Aspect 16 is an apparatus for wireless communication including means for implementing any of aspects 1 to 14.

Aspect 17 is a non-transitory computer-readable storage medium storing computer executable code, where the code, when executed, causes a processor to implement any of aspects 1 to 14.

Aspect 18 is a method of wireless communication at a first UE, comprising: receiving a sidelink transmission from a second UE at a first resource, the sidelink transmission including data-only traffic and scheduling information corresponding to future data traffic; receiving a first indicator indicating a starting resource of the future data traffic; and communicating SPS traffic at the starting resource, the future data traffic including the SPS traffic.

Aspect 19 is the method of aspect 18, further including that the starting resource is different than the first resource.

Aspect 20 is the method of any of aspects 18 and 19, further including that the first indicator includes a time gap value that indexes to the starting resource.

Aspect 21 is the method of any of aspects 18 to 20, further including that the first indicator includes a bitmap that indicates the starting resource.

Aspect 22 is the method of any of aspects 18 to 21, further including that the first UE receives the first indicator in first stage sidelink control information of the sidelink transmission.

Aspect 23 is the method of any of aspects 18 to 22, further including: receiving a second indicator indicating a traffic direction of the future data traffic.

Aspect 24 is the method of any of aspects 18 to 23, further including that the second indicator includes a source identifier of the future data traffic and a destination identifier of the future data traffic.

Aspect 25 is the method of any of aspects 18 to 24, further including that the second indicator includes a field, a first value of the field indicating that the future data traffic is from the second UE to the first UE, and a second value of the field indicating that the future data traffic is from the first UE to the second UE.

Aspect 26 is the method of any of aspects 18 to 25, further including that the first UE receives the second indicator in first stage SCI or second stage SCI of the sidelink transmission.

Aspect 27 is the method of any of aspects 18 to 26, further including: receiving a third indicator indicating a transmitting UE of the future data traffic; and receiving a fourth indicator indicating a target UE of the future data traffic.

Aspect 28 is the method of any of aspects 18 to 27, further including that the transmitting UE is different than the first UE, and the first UE receives the third indicator and the fourth indicator in first stage sidelink control information of the sidelink transmission.

Aspect 29 is the method of any of aspects 18 to 27, further including that the transmitting UE is the first UE, and the first UE receives the third indicator and the fourth indicator in second stage sidelink control information of the sidelink transmission.

Aspect 30 is the method of any of aspects 18 to 29, further including that the first UE communicates the SPS traffic at the starting resource with the second UE.

Aspect 31 is the method of any of aspects 18 to 29, further including that the first UE communicates the SPS traffic at the starting resource with a third UE different than the second UE.

Aspect 32 is the method of any of aspects 18 to 31, further including that the data-only traffic is directed to a third UE different than the second UE.

Aspect 33 is an apparatus for wireless communication including at least one processor coupled to a memory and configured to implement any of aspects 18 to 32.

Aspect 34 is an apparatus for wireless communication including means for implementing any of aspects 18 to 32.

Aspect 35 is a non-transitory computer-readable storage medium storing computer executable code, where the code, when executed, causes a processor to implement any of aspects 18 to 32.

What is claimed is:

1. An apparatus for wireless communication at a first user equipment (UE), comprising:
one or more memories; and
at least one processor coupled to the one or more memories and configured to:
transmit a sidelink transmission to a second UE at a first resource, the sidelink transmission including data-only traffic and scheduling information corresponding to future data traffic;
transmit a time offset indicator indicating a starting resource of the future data traffic; and
transmit a traffic direction indicator indicating a traffic direction of the future data traffic,
wherein the traffic direction indicator includes a field, a first value of the field indicating that the future data traffic is from the first UE to the second UE, and a second value of the field indicating that the future data traffic is from the second UE to the first UE.

2. The apparatus of claim 1, wherein the starting resource is different than the first resource.

3. The apparatus of claim 1, wherein the time offset indicator includes a time gap value that indexes to the starting resource.

4. The apparatus of claim 1, wherein the time offset indicator includes a bitmap that indicates the starting resource.

5. The apparatus of claim 1, wherein the one or more memories and least one processor are configured to transmit the time offset indicator using first stage sidelink control information of the sidelink transmission.

6. The apparatus of claim 1, wherein the traffic direction indicator includes a source identifier of the future data traffic and a destination identifier of the future data traffic.

7. The apparatus of claim 1, wherein the one or more memories and the at least one processor are configured to transmit the traffic direction indicator using first stage sidelink control information (SCI) or second stage SCI of the sidelink transmission.

8. The apparatus of claim 1, wherein the one or more memories and the at least one processor are further configured to:
transmit a source indicator indicating a transmitting UE of the future data traffic; and
transmit a destination indicator indicating a target UE of the future data traffic.

9. The apparatus of claim 8, wherein the transmitting UE is different than the second UE, and the one or more memories and the at least one processor are configured to transmit the source indicator and the destination indicator using first stage sidelink control information of the sidelink transmission.

10. The apparatus of claim 8, wherein the transmitting UE is the second UE, and the one or more memories and the at least one processor are configured to transmit the source indicator and the destination indicator using second stage sidelink control information of the sidelink transmission.

11. The apparatus of claim 1, wherein the future data traffic comprises semi-persistent scheduling (SPS) traffic, the one or more memories and the at least one processor are further configured to:
communicate the SPS traffic with the second UE at the starting resource.

12. The apparatus of claim 1, wherein the data-only traffic is directed to a third UE different than the second UE.

13. The apparatus of claim 1, further comprising a transceiver coupled to the at least one processor.

14. An apparatus for wireless communication at a first user equipment (UE), comprising:
one or more memories; and
at least one processor coupled to the one or more memories and configured to:
receive a sidelink transmission from a second UE at a first resource, the sidelink transmission including data-only traffic and scheduling information corresponding to future data traffic;
receive a first indicator indicating a starting resource of the future data traffic;
receive a second indicator indicating a traffic direction of the future data traffic,
wherein the second indicator includes a field, a first value of the field indicating that the future data traffic is from the second UE to the first UE, and a second value of the field indicating that the future data traffic is from the first UE to the second UE; and
communicate semi-persistent scheduling (SPS) traffic at the starting resource, the future data traffic including the SPS traffic.

15. The apparatus of claim 14, wherein the first indicator includes a time gap value that indexes to the starting resource.

16. The apparatus of claim 14, wherein the first indicator includes a bitmap that indicates the starting resource.

17. The apparatus of claim 14, wherein the one or more memories and the at least one processor are configured to receive the first indicator in first stage sidelink control information of the sidelink transmission.

18. The apparatus of claim 14, wherein the second indicator includes a source identifier of the future data traffic and a destination identifier of the future data traffic.

19. The apparatus of claim 14, wherein the one or more memories and the at least one processor are configured to receive the second indicator in first stage sidelink control information (SCI) or second stage SCI of the sidelink transmission.

20. The apparatus of claim 14, wherein the one or more memories and the at least one processor are further configured to:
receive a third indicator indicating a transmitting UE of the future data traffic; and
receive a fourth indicator indicating a target UE of the future data traffic.

21. The apparatus of claim 20, wherein the transmitting UE is different than the first UE, and wherein the one or more memories and the at least one processor are configured to receive the third indicator and the fourth indicator in first stage sidelink control information of the sidelink transmission.

22. The apparatus of claim 20, wherein the transmitting UE is the first UE, and wherein the one or more memories and the at least one processor are configured to receive the third indicator and the fourth indicator in second stage sidelink control information of the sidelink transmission.

23. The apparatus of claim 14, wherein the one or more memories and the at least one processor are configured to communicate the SPS traffic at the starting resource with the second UE.

24. The apparatus of claim 14, wherein the one or more memories and the at least one processor are configured to communicate the SPS traffic at the starting resource with a third UE different than the second UE.

25. The apparatus of claim 14, wherein the data-only traffic is directed to a third UE different than the second UE.

26. The apparatus of claim 14, further comprising a transceiver coupled to the at least one processor.

27. An apparatus for wireless communication at a first user equipment (UE), comprising:
one or more memories; and
at least one processor coupled to the one or more memories and configured to:
transmit a sidelink transmission to a second UE at a first resource, the sidelink transmission including data-only traffic and scheduling information corresponding to future data traffic;
transmit a time offset indicator indicating a starting resource of the future data traffic;
transmit a source indicator indicating a transmitting UE of the future data traffic; and
transmit a destination indicator indicating a target UE of the future data traffic,
wherein:
the transmitting UE is different than the second UE, and the one or more memories and the at least one processor are configured to transmit the source indicator and the destination indicator using first stage sidelink control information of the sidelink transmission, or
the transmitting UE is the second UE, and the one or more memories and the at least one processor are configured to transmit the source indicator and the destination indicator using second stage sidelink control information of the sidelink transmission.

28. The apparatus of claim 27, wherein the transmitting UE is different than the second UE, and the one or more memories and the at least one processor are configured to transmit the source indicator and the destination indicator using the first stage sidelink control information of the sidelink transmission.

29. The apparatus of claim 27, wherein the transmitting UE is the second UE, and the one or more memories and the at least one processor are configured to transmit the source indicator and the destination indicator using the second stage sidelink control information of the sidelink transmission.

30. The apparatus of claim 27, wherein the starting resource is different than the first resource.

* * * * *